(12) United States Patent
Bassett et al.

(10) Patent No.: US 7,999,812 B2
(45) Date of Patent: Aug. 16, 2011

(54) LOCALITY BASED MORPHING BETWEEN LESS AND MORE DEFORMED MODELS IN A COMPUTER GRAPHICS SYSTEM

(75) Inventors: Scott Bassett, Bellevue, WA (US); Sun Tjen Fam, Vancouver (CA)

(73) Assignee: Nintendo Co, Ltd., Kyoto (JP)

( * ) Notice: Subject to any disclaimer, the term of this patent is extended or adjusted under 35 U.S.C. 154(b) by 1109 days.

(21) Appl. No.: 11/464,769

(22) Filed: Aug. 15, 2006

(65) Prior Publication Data
US 2008/0043042 A1    Feb. 21, 2008

(51) Int. Cl.
*G06T 13/00* (2011.01)
*G09G 5/00* (2006.01)

(52) U.S. Cl. ......... 345/475; 345/646; 345/647; 345/955
(58) Field of Classification Search ............... 345/646, 345/955, 647, 475
See application file for complete search history.

(56) References Cited

U.S. PATENT DOCUMENTS

| | | | | | |
|---|---|---|---|---|---|
| 5,877,769 | A | * | 3/1999 | Shinohara | 345/419 |
| 5,978,744 | A | * | 11/1999 | McBride | 702/95 |
| 6,094,503 | A | * | 7/2000 | Hara | 382/167 |
| 6,306,036 | B1 | | 10/2001 | Burns et al. | |
| 6,351,558 | B1 | * | 2/2002 | Kuwata | 382/168 |
| 6,377,281 | B1 | | 4/2002 | Rosenbluth et al. | |
| 6,417,854 | B1 | * | 7/2002 | Isowaki et al. | 345/473 |
| 6,549,202 | B1 | * | 4/2003 | Hasegawa et al. | 345/426 |
| 6,567,084 | B1 | * | 5/2003 | Mang et al. | 345/426 |
| 6,570,569 | B1 | * | 5/2003 | Tsukamoto et al. | 345/473 |
| 6,690,369 | B1 | * | 2/2004 | Smith et al. | 345/419 |
| 7,084,855 | B2 | * | 8/2006 | Kaku et al. | 345/158 |
| 2002/0005856 | A1 | * | 1/2002 | Sasaki | 345/606 |
| 2002/0070932 | A1 | * | 6/2002 | Kim | 345/419 |
| 2002/0196258 | A1 | * | 12/2002 | Lake et al. | 345/474 |
| 2003/0234788 | A1 | * | 12/2003 | Uesaki et al. | 345/473 |
| 2004/0227761 | A1 | * | 11/2004 | Anderson et al. | 345/473 |
| 2006/0038832 | A1 | * | 2/2006 | Smith et al. | 345/629 |
| 2008/0024435 | A1 | * | 1/2008 | Dohta | 345/156 |

OTHER PUBLICATIONS

Schilling (Schilling, Andreas; "Towards Real-Time Photorealistic Rendering: Challenges and Solutions;" 1997; ACM SIGGRAPH/Eurographics Workshop; pp. 7-15).*

Takahashi, S. et al; "Explicit Control of Topological Transitions in Morphing Shapes of 3D Meshes;" 2001; IEEE; pp. 70-79.*

Noh, Jun-Yong, et al., "Animated Deformations with Radial Basis Functions," VRST 2000 Seoul, Korea, ACM 1-58113-316-2/00/0010, pp. 166-174.

Zhang, Jingdan, et al., "Synthesis of Progressively-Variant Textures on Arbitrary Surfaces," 2003 ACM 0730-0301/03/0700-0287, pp. 295-302.

Milliron, Tim, et al., "A Framework for Geometric Warps and Deformations," ACM Transactions on Graphics, vol. 21, No. 1, Jan. 2002, pp. 20-51.

(Continued)

*Primary Examiner* — Xiao M Wu
*Assistant Examiner* — David T Welch
(74) *Attorney, Agent, or Firm* — Nixon & Vanderhye, P.C.

(57) ABSTRACT

Locality based morphing in a computer graphics system provides efficient techniques for simulating or animating position-based changes including but not limited to deformations. Two models are provided: a model unaffected by a destructive or other process, and a further model that has been totally affected by the process. Position information is used to specify particular parts of the model to morph. Morphing is selectively applied on a spatially localized basis so that only parts of the object are morphed whereas other parts of the object remain unmorphed. Such techniques can be used for example to simulate or animate progressive damage to a target such as an enemy robot.

18 Claims, 19 Drawing Sheets

OTHER PUBLICATIONS

Maloney, John H. et al., "Directness and Liveness in the Morphic User Interface Construction Environment," Nov. 14-17, 1995, UIST 95 Pittsburgh, PA, USA, pp. 21-28.

Du, Haixia, et al., "Interactive Shape Design Using Volumetric Implicit PDEs," SM'03, Jun. 16-20, 2003, Seattle, WA, USA, pp. 235-246.

Kim, Young J., et al., "Fast Penetration Depth Computation for Physically-based Animation," 2002 ACM 1-58113-573-04/02/0007, pp. 23-31 and 187.

Haber, Jorg et al., SIGGRAPH 2004 Course Notes, "Facial Modeling and Animation," pp. 1-174.

Lee, Seung-Yong, et al., "Image Metamorphosis Using Snakes and Free-Form Deformations," 1995 ACM-0-89791-701-4/95/008, 10 pages.

Kry, Paul G., et al., "EigenSkin: Real Time Large Deformation Character Skinning in Hardware," 2002 ACM 1-58113-573-04/02/007, pp. 153-159, 200.

* cited by examiner

NON-LIMITING
EXAMPLE GAME SYSTEM

NON-LIMITING EXAMPLE CONTROLLER

NON-LIMITING EXAMPLE CONTROLLER

Vertex Normal

LOCALITY BASED MORPHING BETWEEN LESS AND MORE DEFORMED MODELS IN A COMPUTER GRAPHICS SYSTEM

FIELD

The technology herein relates to computer graphics, and more particularly to localized morphing between computer generated models. Still more particularly, the technology herein relates to systems, methods, techniques and stored programs that provide real time interactive computer imagery between less deformed and more deformed models of an object, wherein only parts of the object initially appear deformed based on user input.

BACKGROUND AND SUMMARY

Changes tend to visually stimulate. Staring at a static painting or other fixed image in a gallery can be interesting and contemplative, but most people tend to prefer to view images that exhibit changes. In the real world, wind blowing through a tree causes every leaf to move and deform. Dropping an object onto the surface of water causes the surface to deform with waves and ripples. The flickering flames of a fire create a continuously changing pattern and also slowly transform the shape of the fuel that is being consumed. A car in a demolition derby will become progressively damaged and dented as it encounters one collision after another. These kinds of visual changes captivate and fascinate us and keep our interest.

Anthropologists and behavioral scientists theorize that we humans have evolved in a way that makes us notice changes in our environment. A slight change in our surroundings might indicate the presence of a predator or an enemy. Whatever the reason, people are generally interested in the way a visual changes. For example, when viewing a vista or landscape, we tend to focus in on what is changing (e.g., smoke rising, cars moving, lights flashing, etc.). The changing parts of the scene tend to interest us more than the static parts.

Computer graphics scientists and video game developers have long sought to realistically model changes in computer graphics generated scenes. Almost anything in the real world can be visually modeled using computer graphics given sufficient computation power and computation time. However, generating computer graphics images interactively in real time based on user input typically has significant constraints with respect to efficiency and often computation power. For example, video game developers are often constrained by relatively low capability computer graphics hardware and the need to produce images that rapidly respond (e.g., once every $\frac{1}{30}$ or $\frac{1}{60}$ or a second) to changing user inputs.

One approach to changing or deforming a computer graphic model of an object is to mathematically perturb the object's shape in particular desired ways. For example, it is possible to model an object surface using a wire frame that can be mathematically perturbed using various techniques to provide realistic changes or deformations. Such techniques have been used successfully in the past to realistically model a variety of objects such as flags flying in the breeze, ripples propagating across the surface of a pond, and other interesting visual effects. Fractals have been used, for example, as a way to create interesting perturbations that appear to accurately model real world effects such as wind, flames and other influences. While some such techniques have been used successfully in video games, such mathematical techniques can be relatively computationally intensive and may therefore not be readily accessible by those developing interactive images displayable on low-capability computer graphics systems such as home and portable video game platforms.

Another technique that has been widely used in video games and other computer graphics is called "morphing." The basic idea behind morphing is to interpolate between two different computer graphic models. For example, to realistically model a person's face, one approach is to provide a number of different models with different facial expressions. One model might show the face with no expression. Another model might show the face with a smile. A third model might show the face with a frown. Rather than attempting to calculate mathematically how to change from one model to another, a "morphing" technique is used to generate a range of intermediate images between the two models. Such interpolation between a pair of different position, color or other values can be done relatively efficiently. Any number of progressive changes between the two models can be used depending upon the precision desired. A smooth, gradual interpolation between two different computer models such as facial expressions can be performed interactively with excellent results using low capability computer graphics hardware. See for example Haber et al., SIGGRAPH 2004 Course Notes "Facial Modeling and Animation": (incorporated herein by reference).

Generally, morphing in the past has been performed with respect to entire models. Dramatic effects such as seen in science fiction motion pictures have been generated in this way. For example, it is possible to "morph" one person's shape into that of another to make it appear as if the person is changing into another person, an animal or other object.

However, there are certain kinds of computer graphics simulations and animations where it would be desirable to change only parts of a model. Take, for example, the example above of a demolition derby car. New dents will appear in various positions on the car's body depending upon where collisions occur. At the end of the demolition derby, the car may be completely damaged and dented. However, if one wished to show progressive denting and deformation of the demolition derby car, it would be necessary to provide selective deformation of different parts of the car's body with each new collision. It is not readily apparent how morphing could be used to provide such an effect. A more common approach might be to selectively calculate perturbations or deformations due to collision impacts at each collision position and apply such deformations to the wireframe model of the car.

We have developed efficient techniques that allow computer graphics objects appear to be progressively deformed while giving the artist complete control over how the final deformed object would appear. In one exemplary illustrative non-limiting implementation, we created two 3-D models: an original undeformed model, and a final, completely deformed model. We then generated data for performing locality based morphing between the models. During interactive run time, we create a new model that will be the drawn model. We also create an internal data structure indicating how much to morph between each vertex of the 3D model. If the object is acted upon during user interaction, we calculate or otherwise determine where the object was acted upon and we also determine how much force or impact was applied to the object at that position. We use this position and force information to perform a locality based morph. It is possible to apply deformation amount to morphing blend values for specific vertices that will be affected. Using the morphing blend values, we morph geometry by interpolating, in a spatially localized way, between the original non-deformed model and the completely deformed model. We then update vertex normals so that the lighting will be corrected.

Using such a technique, we can provide very efficient transformation between the two objects with only a part of the displayed model showing deformations based for example on user interaction. It is thus possible to selectively morph only certain portions of the model while allowing other portions of the model to remain undeformed or otherwise unchanged. We can provide such effects while using and storing only two initial models—a completely undeformed model and a completely deformed model.

One exemplary illustrative non-limiting specific implementation is to simulate or animate damage to an object based on an attack. For example, in a fighting video game, a user can target different portions of an object such as a robot, a building or other enemy and apply projectiles, hammer blows or other forms of attack can cause the object to become progressively damaged in different places depending upon where the attack lands. Our locality-based morphing technique provides an efficient way to model such progressive damage on a low-capability computer graphics platform such as a home or portable video game machine.

BRIEF DESCRIPTION OF THE DRAWINGS

These and other features and advantages will be better and more completely understood by referring to the following detailed description of exemplary non-limiting illustrative embodiments in conjunction with the drawings of which.

DETAILED DESCRIPTION

Techniques described herein can be performed on any type of computer graphics system including a personal computer, a home video game machine, a portable video game machine, a networked server and display, a cellular telephone, a personal digital assistant, or any other type of device or arrangement having computation and graphical display capabilities. One exemplary illustrative non-limiting implementation includes a home video game system such as the Nintendo Wii 3D video game system, a Nintendo DS or other 3D capable interactive computer graphics display system. One exemplary illustrative non-limiting implementation is described below, but other implementations are possible.

Exemplary Video Game Platform

Figure 1:
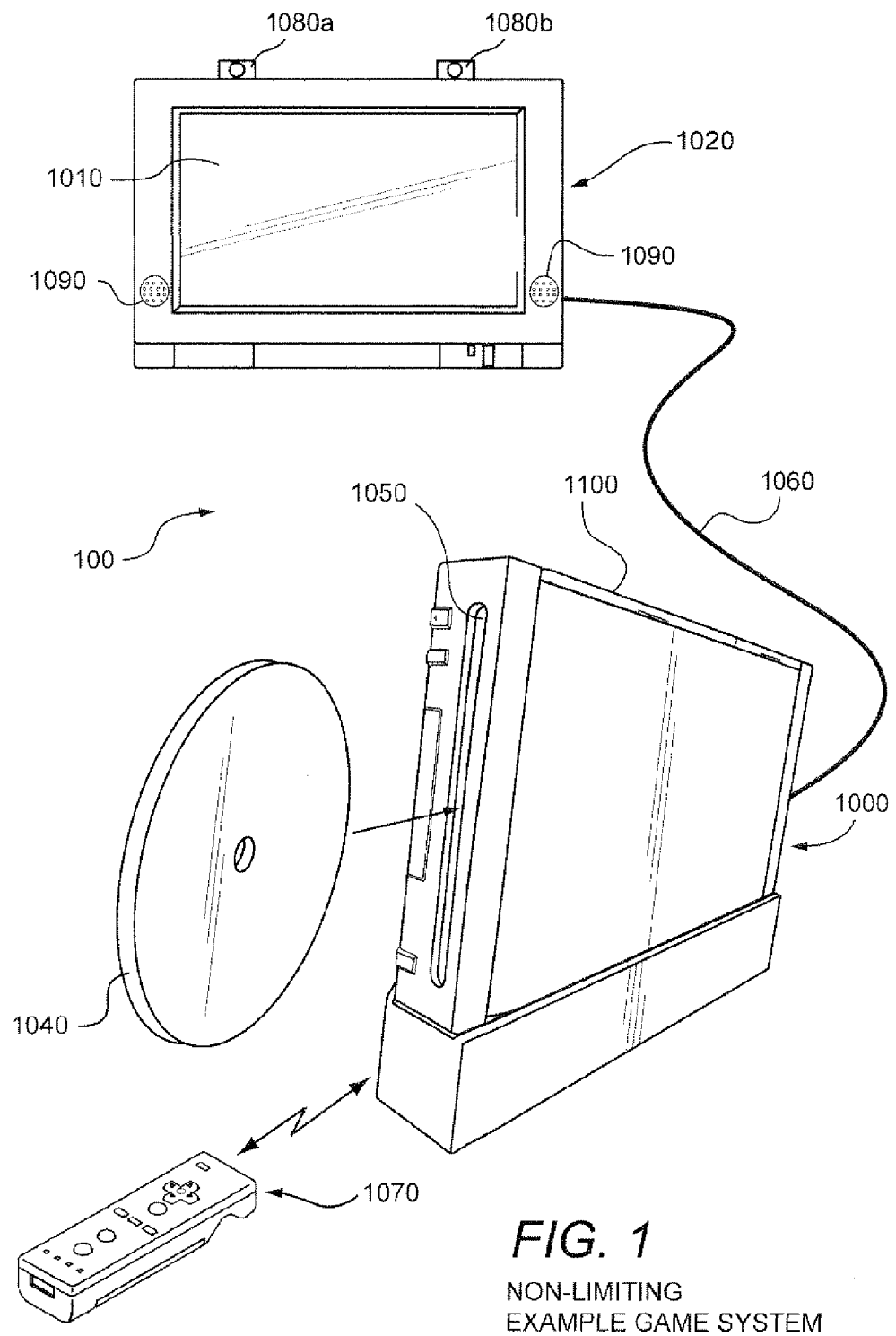
FIG. 1 shows an exemplary external view of a non-limiting interactive computer graphics system in the form of a home video game apparatus for executing a game program.

FIG. 1 shows a non-limiting example game system 100 including a game console 1000, a television 1020 and a controller 1070.

Game console 1000 executes a game program or other application stored on optical disc 1040 inserted into slot 1050 formed in housing 110 thereof. The result of the execution of the game program or other application is displayed on display 1010 of television 1020 to which game console 1000 is connected by cable 106. Audio associated with the game program or other application is output via speakers 1090 of television 1020. While an optical disk is shown in FIG. 1 for use in storing video game software, the game program or other application may alternatively or additionally be stored on other storage media such as semiconductor memories, magneto-optical memories, magnetic memories and the like and/or downloaded over a network or by other means.

Controller 1070 wirelessly transmits data such as game control data to the game console 1000. The game control data may be generated using an operation section of controller 1070 having, for example, a plurality of operation buttons, a key, a stick and the like. Controller 1070 may also wirelessly receive data transmitted from game console 1000. Any one of various wireless protocols such as Bluetooth (registered trademark) may be used for the wireless transmissions between controller 1070 and game console 1000.

As discussed below, controller 1070 also includes an imaging information calculation section for capturing and processing images from light-emitting devices 1080a and 1080b. Preferably, a center point between light-emitting devices 1080a and 1080b is aligned with a vertical center line of television 1010. The images from light-emitting devices 1080a and 1080b can be used to determine a direction in which controller 1070 is pointing as well as a distance of controller 1070 from display 1010. By way of example without limitation, light-emitting devices 1080a and 1080b may be implemented as two LED modules (hereinafter, referred to as "markers") provided in the vicinity of a display screen of television 1020. The markers each output infrared light and the imaging information calculation section of controller 1070 detects the light output from the LED modules to determine a direction in which controller 1070 is pointing and a distance of controller 1070 from display 1010 as mentioned above. As will become apparent from the description below, various implementations of the system and method for simulating the striking of an object described herein do not require use such markers.

Although markers 1080a and 1080b are shown in FIG. 1 as being above television 1000, they may also be positioned below television 1000 or in other configurations.

Figure 2:
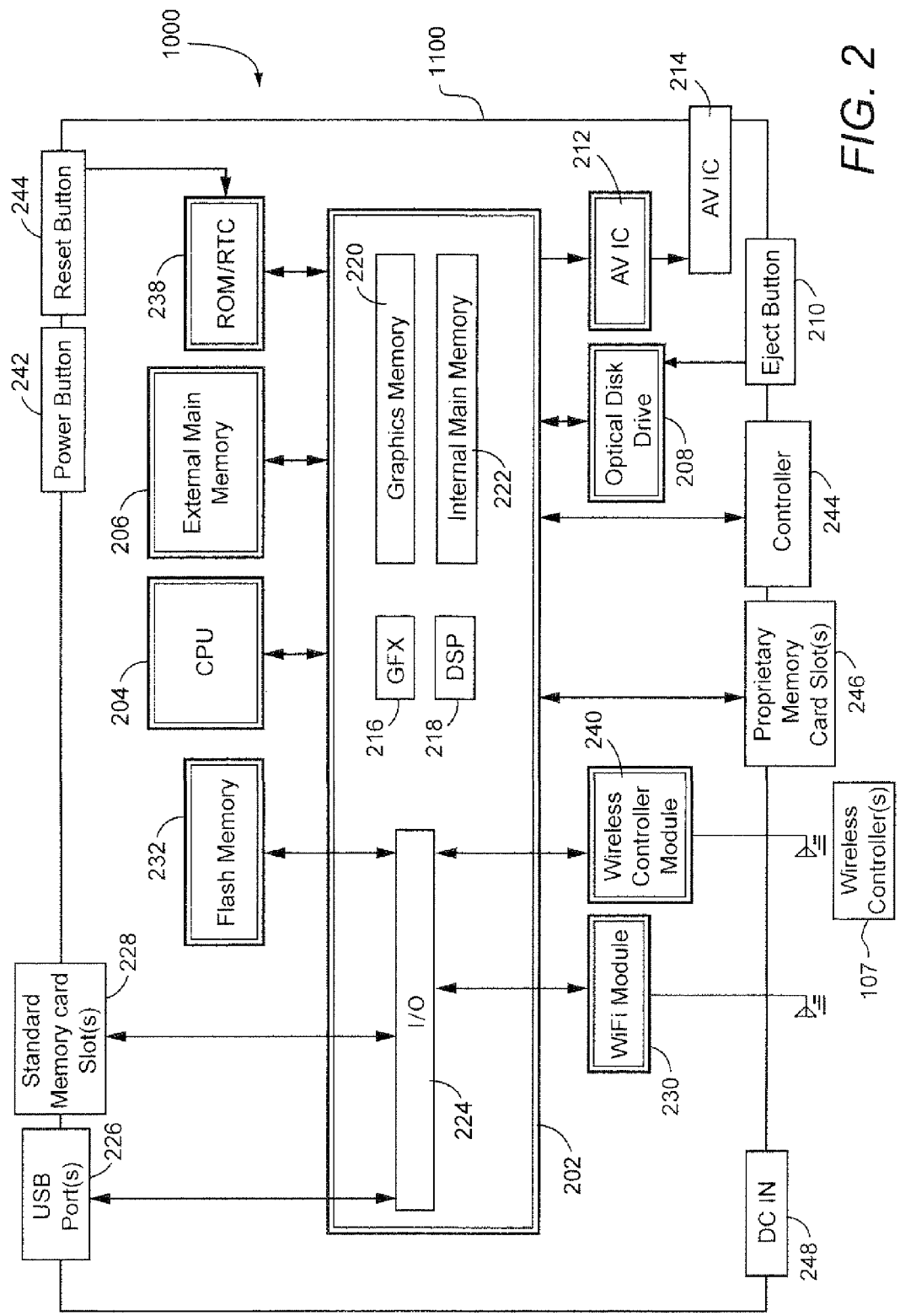
FIG. 2 is a block diagram showing an internal structure of the game apparatus.

With reference to the block diagram of FIG. 2, game console 1000 includes a RISC central processing unit (CPU) 204 for executing various types of applications including (but not limited to) video game programs. CPU 204 executes a boot program stored in a boot ROM (not shown) to initialize game console 1000 and then executes an application (or applications) stored on optical disc 1040 which is inserted in optical disk drive 208. User-accessible eject button 210 provided on housing 1100 of game console 1000 may be used to eject an optical disk from disk drive 208.

In one example implementation, optical disk drive 208 receives both optical disks of a first type (e.g., of a first size and/or of a first data structure, etc.) containing applications developed for execution by CPU 204 and graphics processor 216 and optical disks of a second type (e.g., of a second size and/or a second data structure) containing applications originally developed for execution by a different CPU and/or graphics processor. For example, the optical disks of the second type may be applications originally developed for the Nintendo GameCube platform.

CPU 204 is connected to system LSI 202 that includes graphics processing unit (GPU) 216 with an associated graphics memory 220, audio digital signal processor (DSP) 218, internal main memory 222 and input/output (IO) processor 224.

IO processor 224 of system LSI 202 is connected to one or more USB ports 226, one or more standard memory card slots (connectors) 228, WiFi module 230, flash memory 232 and wireless controller module 240.

USB ports 226 are used to connect a wide variety of external devices to game console 1000. These devices include by way of example without limitation game controllers, keyboards, storage devices such as external hard-disk drives, printers, digital cameras, and the like. USB ports 226 may also be used for wired network (e.g., LAN) connections. In one example implementation, two USB ports 226 are provided.

Standard memory card slots (connectors) 228 are adapted to receive industry-standard-type memory cards (e.g., SD memory cards). In one example implementation, one memory card slot 228 is provided. These memory cards are generally used as data carriers. For example, a player may store game data for a particular game on a memory card and bring the memory card to a friend's house to play the game on the friend's game console. The memory cards may also be used to transfer data between the game console and personal computers, digital cameras, and the like.

WiFi module 230 enables game console 100 to be connected to a wireless access point. The access point may provide internet connectivity for on-line gaming with players at other locations (with or without voice chat capabilities), as well as web browsing, e-mail, file downloads (including game downloads) and many other types of on-line activities. In some implementations, WiFi module may also be used for communication with other game devices such as suitably-equipped hand-held game devices. Module 230 is referred to herein as "WiFi", which is generally used in connection with the family of IEEE 802.11 specifications. However, game console 1000 may of course alternatively or additionally use wireless modules that conform with other wireless standards.

Flash memory 232 stores, by way of example without limitation, game save data, system files, internal applications for the console and downloaded data (such as games).

Wireless controller module 240 receives signals wirelessly transmitted from one or more controllers 1070 and provides these received signals to IO processor 224. The signals transmitted by controller 1070 to wireless controller module 240 may include signals generated by controller 1070 itself as well as by other devices that may be connected to controller 1070. By way of example, some games may utilize separate right- and left-hand inputs. For such games, another controller (not shown) may be connected to controller 1070 and controller 1070 could transmit to wireless controller module 240 signals generated by itself and by the other controller.

Wireless controller module 240 may also wirelessly transmit signals to controller 1070. By way of example without limitation, controller 1070 (and/or another game controller connected thereto) may be provided with vibration circuitry and vibration circuitry control signals may be sent via wireless controller module 240 to control the vibration circuitry. By way of further example without limitation, controller 1070 may be provided with (or be connected to) a speaker (not shown) and audio signals for output from this speaker may be wirelessly communicated to controller 1070 via wireless controller module 240. By way of still further example without limitation, controller 1070 may be provided with (or be connected to) a display device (not shown) and display signals for output from this display device may be wirelessly communicated to controller 1070 via wireless controller module 240.

Proprietary memory card slots 246 are adapted to receive proprietary memory cards. In one example implementation, two such slots are provided. These proprietary memory cards have some non-standard feature such as a non-standard connector or a non-standard memory architecture. For example, one or more of the memory card slots 246 may be adapted to receive memory cards developed for the Nintendo GameCube platform. In this case, memory cards inserted in such slots can transfer data from games developed for the GameCube platform. In an example implementation, memory card slots 246 may be used for read-only access to the memory cards inserted therein and limitations may be placed on whether data on these memory cards can be copied or transferred to other storage media such as standard memory cards inserted into slots 228.

One or more controller connectors 244 are adapted for wired connection to respective game controllers. In one example implementation, four such connectors are provided for wired connection to game controllers for the Nintendo GameCube platform. Alternatively, connectors 244 may be connected to respective wireless receivers that receive signals from wireless game controllers. These connectors enable players, among other things, to use controllers for the Nintendo GameCube platform when an optical disk for a game developed for this platform is inserted into optical disk drive 208.

A connector 248 is provided for connecting game console 1000 to DC power derived, for example, from an ordinary wall outlet. Of course, the power may be derived from one or more batteries.

GPU 216 performs image processing based on instructions from CPU 204. GPU 216 includes, for example, circuitry for performing calculations necessary for displaying three-dimensional (3D) graphics. GPU 216 performs image processing using graphics memory 220 dedicated for image processing and a part of internal main memory 222. GPU 216 generates image data for output to television 102 by audio/video connector 214 via audio/video IC (interface) 212.

Audio DSP 218 performs audio processing based on instructions from CPU 204. The audio generated by audio DSP 218 is output to television 102 by audio/video connector 214 via audio/video IC 212.

External main memory 206 and internal main memory 222 are storage areas directly accessible by CPU 204. For example, these memories can store an application program such as a game program read from optical disc 104 by the CPU 204, various types of data or the like.

ROM/RTC 238 includes a real-time clock and preferably runs off of an internal battery (not shown) so as to be usable even if no external power is supplied. ROM/RTC 238 also may include a boot ROM and SRAM usable by the console.

Power button 242 is used to power game console 1000 on and off. In one example implementation, power button 242 must be depressed for a specified time (e.g., one or two seconds) to turn the consoled off so as to reduce the possibility of inadvertently turn-off. Reset button 244 is used to reset (re-boot) game console 1000.

Figure 3A:
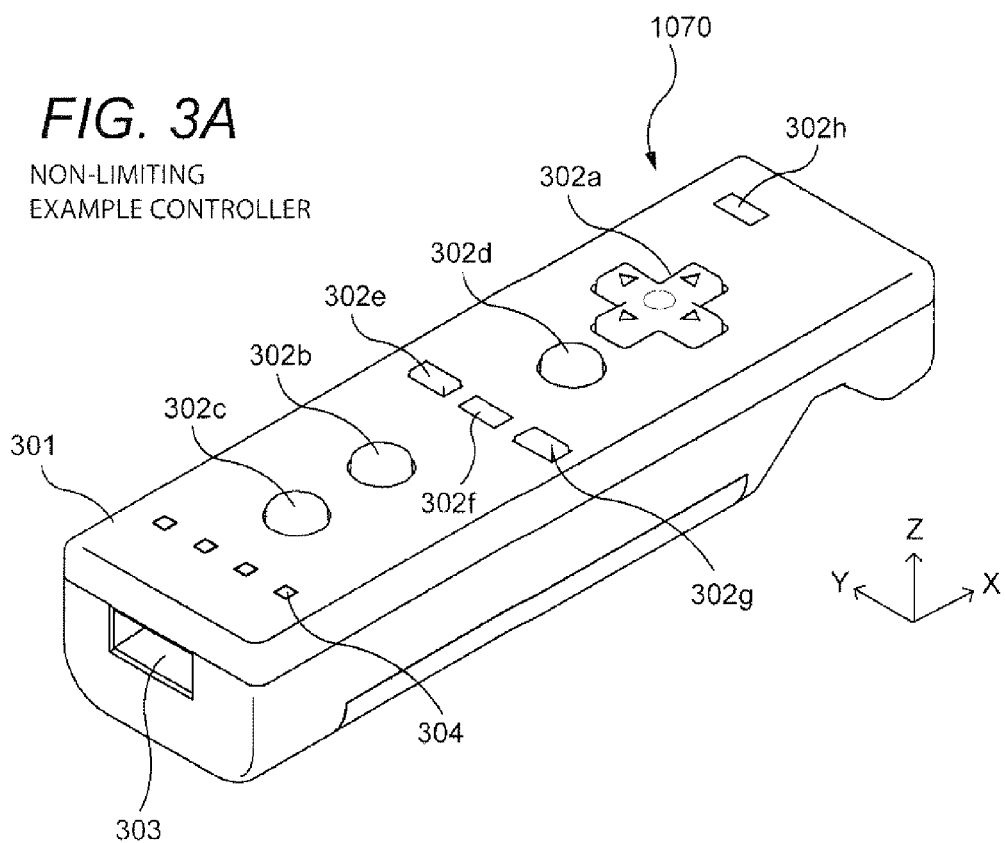
FIGS. 3A, 3B and 4 show different views of an exemplary illustrative non-limiting handheld controller for the video game system of FIG. 1.
Figure 3B:
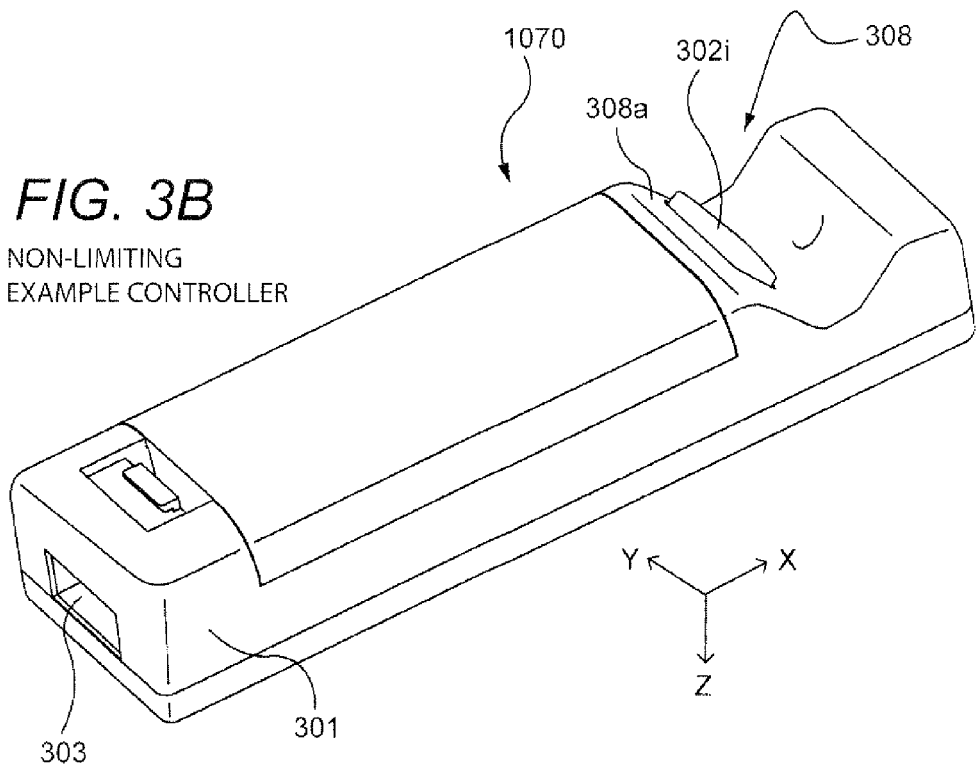
Figure 4:
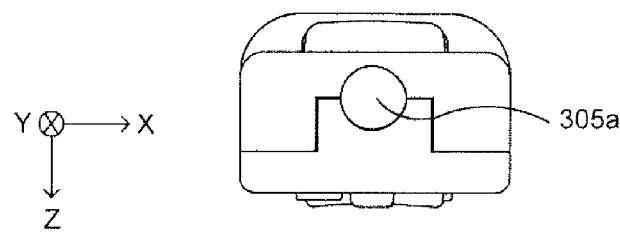

With reference to FIGS. 3 and 4, example controller 1070 includes a housing 301 on which operating controls 302*a*-302*h* are provided. Housing 301 has a generally parallelepiped shape and is sized to be conveniently holdable in a player's hand. Cross-switch 302*a* is provided at the center of a forward part of a top surface of the housing 301. Cross-switch 302*a* is a cross-shaped four-direction push switch which includes operation portions corresponding to the directions designated by the arrows (front, rear, right and left), which are respectively located on cross-shaped projecting portions. A player selects one of the front, rear, right and left directions by pressing one of the operation portions of the cross-switch 302*a*. By actuating cross-switch 302*a*, the player can, for example, move a character in different directions in a virtual game world.

Cross-switch 302*a* is described by way of example and other types of operation sections may be used. By way of example without limitation, a composite switch including a push switch with a ring-shaped four-direction operation section and a center switch may be used. By way of further example without limitation, an inclinable stick projecting from the top surface of housing 301 that outputs signals in accordance with the inclining direction of the stick may be used. By way of still further example without limitation, a horizontally slidable disc-shaped member that outputs signals in accordance with the sliding direction of the disc-shaped member may be used. By way of still further example without limitation, a touch pad may be used. By way of still further example without limitation, separate switches corresponding to at least four directions (e.g., front, rear, right and left) that output respective signals when pressed by a player may be used.

Buttons (or keys) 302*b* through 302*g* are provided rearward of cross-switch 302*a* on the top surface of housing 301. Buttons 302*b* through 302*g* are operation devices that output respective signals when a player presses them. For example, buttons 302*b* through 302*d* are respectively an "X" button, a "Y" button and a "B" button and buttons 302*e* through 302*g* are respectively a select switch, a menu switch and a start switch, for example. Generally, buttons 302*b* through 302*g* are assigned various functions in accordance with the application being executed by game console 1000. In an exemplary arrangement shown in FIG. 3, buttons 302*b* through 302*d* are linearly arranged along a front-to-back centerline of the top surface of housing 301. Buttons 302*e* through 302*g* are linearly arranged along a left-to-right line between buttons 302*b* and 302*d*. Button 302*f* may be recessed from a top surface of housing 301 to reduce the possibility of inadvertent pressing by a player grasping controller 1070.

Button 302*h* is provided forward of cross-switch 302*a* on the top surface of the housing 301. Button 302*h* is a power switch for remote on-off switching of the power to game console 1000. Button 302*h* may also be recessed from a top surface of housing 301 to reduce the possibility of inadvertent pressing by a player.

A plurality (e.g., four) of LEDs 304 is provided rearward of button 302*c* on the top surface of housing 301. Controller 1070 is assigned a controller type (number) so as to be distinguishable from the other controllers used with game console 1000 and LEDs may 304 may be used to provide a player a visual indication of this assigned controller number. For example, when controller 1070 transmits signals to wireless controller module 240, one of the plurality of LEDs corresponding to the controller type is lit up.

With reference to FIG. 3B, a recessed portion 308 is formed on a bottom surface of housing 301. Recessed portion 308 is positioned so as to receive an index finger or middle finger of a player holding controller 1070. A button 302*i* is provided on a rear, sloped surface 308*a* of the recessed portion. Button 302*i* functions, for example, as an "A" button which can be used, by way of illustration, as a trigger switch in a shooting game.

As shown in FIG. 4, an imaging element 305*a* is provided on a front surface of controller housing 301. Imaging element 305*a* is part of an imaging information calculation section of controller 107 that analyzes image data received from markers 1080*a* and 1080*b*. Imaging information calculation section 305 has a maximum sampling period of, for example, about 200 frames/sec., and therefore can trace and analyze even relatively fast motion of controller 1070. The techniques described herein of simulating the striking of an object can be achieved without using information from imaging information calculation section 508, and thus further detailed description of the operation of this section is omitted. Additional details may be found in Application. Nos. 60/716,937, entitled "VIDEO GAME SYSTEM WITH WIRELESS MODULAR HANDHELD CONTROLLER," filed on Sep. 15, 2005; 60/732,648, entitled "INFORMATION PROCESSING PROGRAM," filed on Nov. 3, 2005; and application No. 60/732,649, entitled "INFORMATION PROCESSING SYSTEM AND PROGRAM THEREFOR," filed on Nov. 3, 2005. The entire contents of each of these applications are incorporated herein.

Connector 303 is provided on a rear surface of controller housing 301. Connector 303 is used to connect devices to controller 1070. For example, a second controller of similar or different configuration may be connected to controller 1070 via connector 303 in order to allow a player to play games using game control inputs from both hands. Other devices including game controllers for other game consoles, input devices such as keyboards, keypads and touchpads and output devices such as speakers and displays may be connected to controller 1070 using connector 303.

For ease of explanation in what follows, a coordinate system for controller 1070 will be defined. As shown in. FIGS. 3 and 4, a left-handed X, Y, Z coordinate system has been defined for controller 1070. Of course, this coordinate system is described by way of example without limitation and the systems and methods described herein are equally applicable when other coordinate systems are used.

Figure 5:
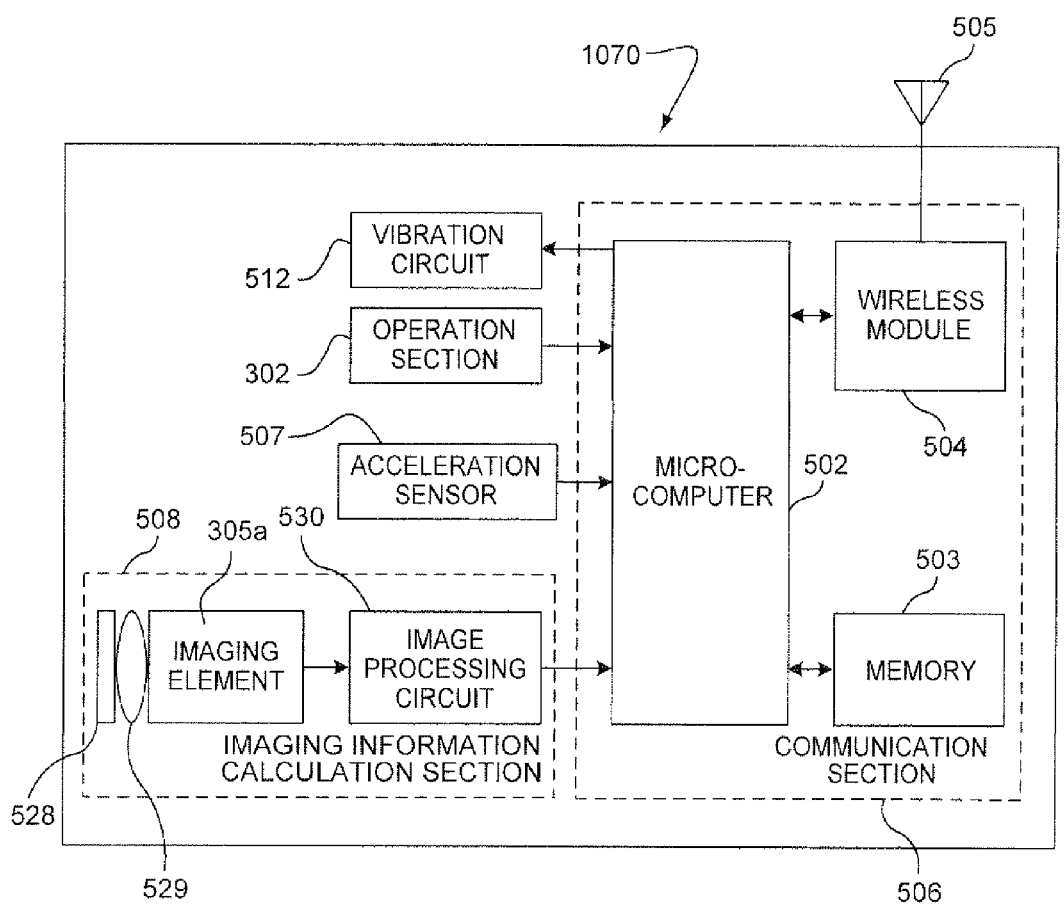
FIG. 5 is a block diagram of an exemplary illustrative non-limiting implementation of the handheld controller.

As shown in the block diagram of FIG. 5, controller 1070 includes a three-axis, linear acceleration sensor 507 that detects linear acceleration in three directions, i.e., the up/down direction (Z-axis shown in FIGS. 3 and 4), the left/right direction (X-axis shown in FIGS. 3 and 4), and the forward/backward direction (Y-axis shown in FIGS. 3 and 4). Alternatively, a two-axis linear accelerometer that only detects linear acceleration along each of the Y-axis and Z-axis may be used or a one-axis linear accelerometer that only detects linear acceleration along the Z-axis may be used. Generally speaking, the accelerometer arrangement (e.g., three-axis or two-axis) will depend on the type of control signals desired. As a non-limiting example, the three-axis or two-axis linear accelerometer may be of the type available from Analog Devices, Inc. or STMicroelectronics N.V. Preferably, acceleration sensor 507 is an electrostatic capacitance or capacitance-coupling type that is based on silicon micro-machined MEMS (micro-electromechanical systems) technology. However, any other suitable accelerometer technology (e.g., piezoelectric type or piezoresistance type) now existing or later developed may be used to provide three-axis or two-axis linear acceleration sensor 507.

As one skilled in the art understands, linear accelerometers, as used in acceleration sensor 507, are only capable of detecting acceleration along a straight line corresponding to each axis of the acceleration sensor. In other words, the direct output of acceleration sensor 507 is limited to signals indicative of linear acceleration (static or dynamic) along each of the two or three axes thereof. As a result, acceleration sensor 507 cannot directly detect movement along a non-linear (e.g. arcuate) path, rotation, rotational movement, angular displacement, tilt, position, attitude or any other physical characteristic.

However, through additional processing of the linear acceleration signals output from acceleration sensor 507, additional information relating to controller 1070 can be inferred or calculated (i.e., determined), as one skilled in the art will readily understand from the description herein. For example, by detecting static, linear acceleration (i.e., gravity), the linear acceleration output of acceleration sensor 507 can be used to determine tilt of the object relative to the gravity vector by correlating tilt angles with detected linear acceleration. In this way, acceleration sensor 507 can be used in combination with micro-computer 502 of controller 1070 (or another processor) to determine tilt, attitude or position of controller 1070. Similarly, various movements and/or positions of controller 1070 can be calculated through processing of the linear acceleration signals generated by acceleration sensor 507 when controller 1070 containing acceleration sensor 307 is subjected to dynamic accelerations by, for example, the hand of a user, as will be explained in detail below.

In another embodiment, acceleration sensor 507 may include an embedded signal processor or other type of dedicated processor for performing any desired processing of the acceleration signals output from the accelerometers therein prior to outputting signals to micro-computer 502. For example, the embedded or dedicated processor could convert the detected acceleration signal to a corresponding tilt angle (or other desired parameter) when the acceleration sensor is intended to detect static acceleration (i.e., gravity).

Returning to FIG. 5, image information calculation section 505 of controller 107 includes infrared filter 528, lens 529, imaging element 305*a* and image processing circuit 530. Infrared filter 528 allows only infrared light to pass therethrough from the light that is incident on the front surface of controller 1070. Lens 529 collects and focuses the infrared light from infrared filter 528 on imaging element 305*a*. Imaging element 305*a* is a solid-state imaging device such as, for example, a CMOS sensor or a CCD. Imaging element 305*a* captures images of the infrared light from markers 1080*a* and 1080*b* collected by lens 309. Accordingly, imaging element 305*a* captures images of only the infrared light that has passed through infrared filter 528 and generates image data based thereon. This image data is processed by image processing circuit 530 which detects an area thereof having high brightness, and, based on this detecting, outputs processing result data representing the detected coordinate position and size of the area to communication section 506. From this information, the direction in which controller 1070 is pointing and the distance of controller 1070 from display 1010 can be determined.

Vibration circuit 512 may also be included in controller 1070. Vibration circuit 512 may be, for example, a vibration motor or a solenoid. Controller 1070 is vibrated by actuation of the vibration circuit 512 (e.g., in response to signals from game console 1000), and the vibration is conveyed to the hand of the player holding controller 1070. Thus, a so-called vibration-responsive game may be realized.

As described above, acceleration sensor 507 detects and outputs the acceleration in the form of components of three axial directions of controller 1070, i.e., the components of the up-down direction (Z-axis direction), the left-right direction (X-axis direction), and the front-rear direction (the Y-axis direction) of controller 1070. Data representing the acceleration as the components of the three axial directions detected by acceleration sensor 507 is output to communication section 506. Based on the acceleration data which is output from acceleration sensor 507, a motion of controller 1070 can be determined.

Communication section 506 includes micro-computer 502, memory 503, wireless module 504 and antenna 505. Micro-computer 502 controls wireless module 504 for transmitting and receiving data while using memory 503 as a storage area during processing. Micro-computer 502 is supplied with data including operation signals (e.g., cross-switch, button or key data) from operation section 302, acceleration signals in the three axial directions (X-axis, Y-axis and Z-axis direction acceleration data) from acceleration sensor 507, and processing result data from imaging information calculation section 508. Micro-computer 502 temporarily stores the data supplied thereto in memory 503 as transmission data for transmission to game console 1000. The wireless transmission from communication section 506 to game console 1000 is performed at a predetermined time interval. Because game processing is generally performed at a cycle of 1/60 sec. (16.7 ms), the wireless transmission is preferably performed at a cycle of a shorter time period. For example, a communication section structured using Bluetooth (registered trademark) technology can have a cycle of 5 ms. At the transmission time, micro-computer 502 outputs the transmission data stored in memory 503 as a series of operation information to wireless module 504. Wireless module 504 uses, for example, Bluetooth (registered trademark) technology to send the operation information from antenna 505 as a carrier wave signal having a specified frequency. Thus, operation signal data from operation section 302, the X-axis, Y-axis and Z-axis direction acceleration data from acceleration sensor 507, and the processing result data from imaging information calculation section 505 are transmitted from controller 1070. Game console 1000 receives the carrier wave signal and demodulates or decodes the carrier wave signal to obtain the operation information (e.g., the operation signal data, the X-axis, Y-axis and Z-axis direction acceleration data, and the processing result data). Based on this received data and the application currently being executed, CPU 204 of game console 1000 performs application processing. If communication section 506 is structured using Bluetooth (registered trademark) technology, controller 1070 can also receive data wirelessly transmitted thereto from devices including game console 1000.

The exemplary illustrative non-limiting system described above can be used to execute software stored on optical disk 1040 or in other memory that controls it to interactive generate displays on display 1010 of a progressively deformed object in response to user input provided via controller 1070. Exemplary illustrative non-limiting software controlled techniques for generating such displays will now be described.

Exemplary Localized Morphing

Figure 6:
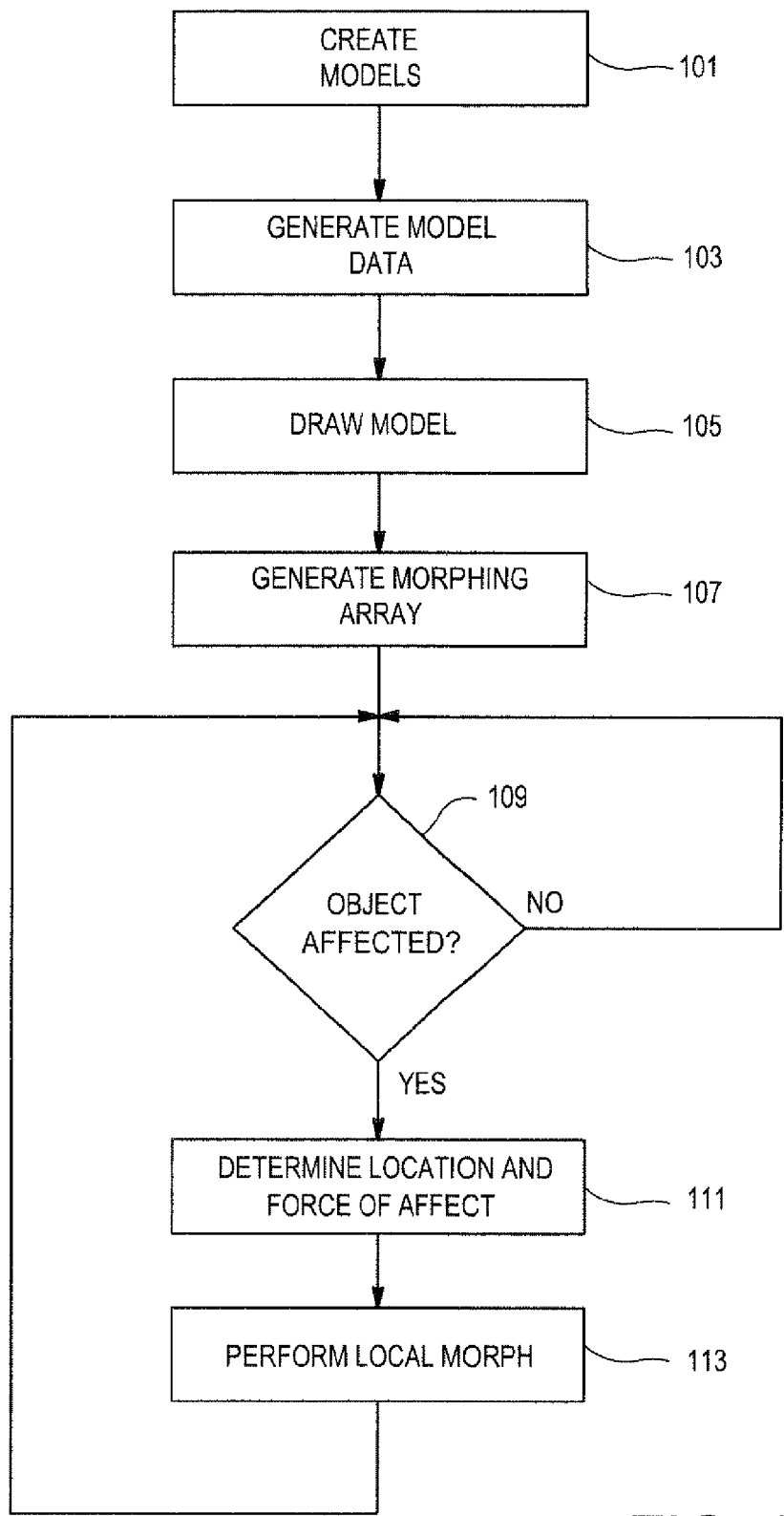
FIG. 6 is an exemplary flowchart of an illustrative non-limiting method for performing a localized morphing.

According to one exemplary illustrative non-limiting implementation shown in FIG. 6, the developer of such software can, through a series of steps prepare a computer generated model for morphing and allow the end user to apply one or more localized morphs to achieve realistic in-game interactions with an object to be progressively deformed. In one exemplary illustrative non-limiting implementation, an object such as a robot (see FIG. 13 and following) can be progressively dented by striking it repeatedly with a weapon such as a hammer. The techniques herein can be used to provide such progressive deformation in a computationally efficient and economic manner.

According to one exemplary illustrative non-limiting implementation, the developer generates (block 101) an initial model and a final model of an object. The initial model is used to display a version of the object as the player earlier encounters the model, e.g., before the player has interacted with the object. The final model represents the object in a fully altered state—what the designer would have the model look like once the player has completely interacted with the model.

As one example, if a player were going to strike an object with a hammer or other weapon repeatedly and dent the object in various places, then the initial model might be a smooth, unbroken, undented model and the final model might be a completely dented model, or at least dented to a degree that the developer desires. Other implementations could provide the initial model as being fully deformed and the final model as being fully undeformed if a different process (e.g., dent removal) was being performed on the object. The techniques herein are applicable to any process that changes the shape and/or appearance of an object in any way by deformation or any other shape or appearance altering process or other mechanism.

In one exemplary illustrative non-limiting implementation, the software developer uses a 3D authoring tool program of conventional design to create the two models. Such models may be 3D models of conventional design constructed of polygons having vertices and textures.

Figure 8:
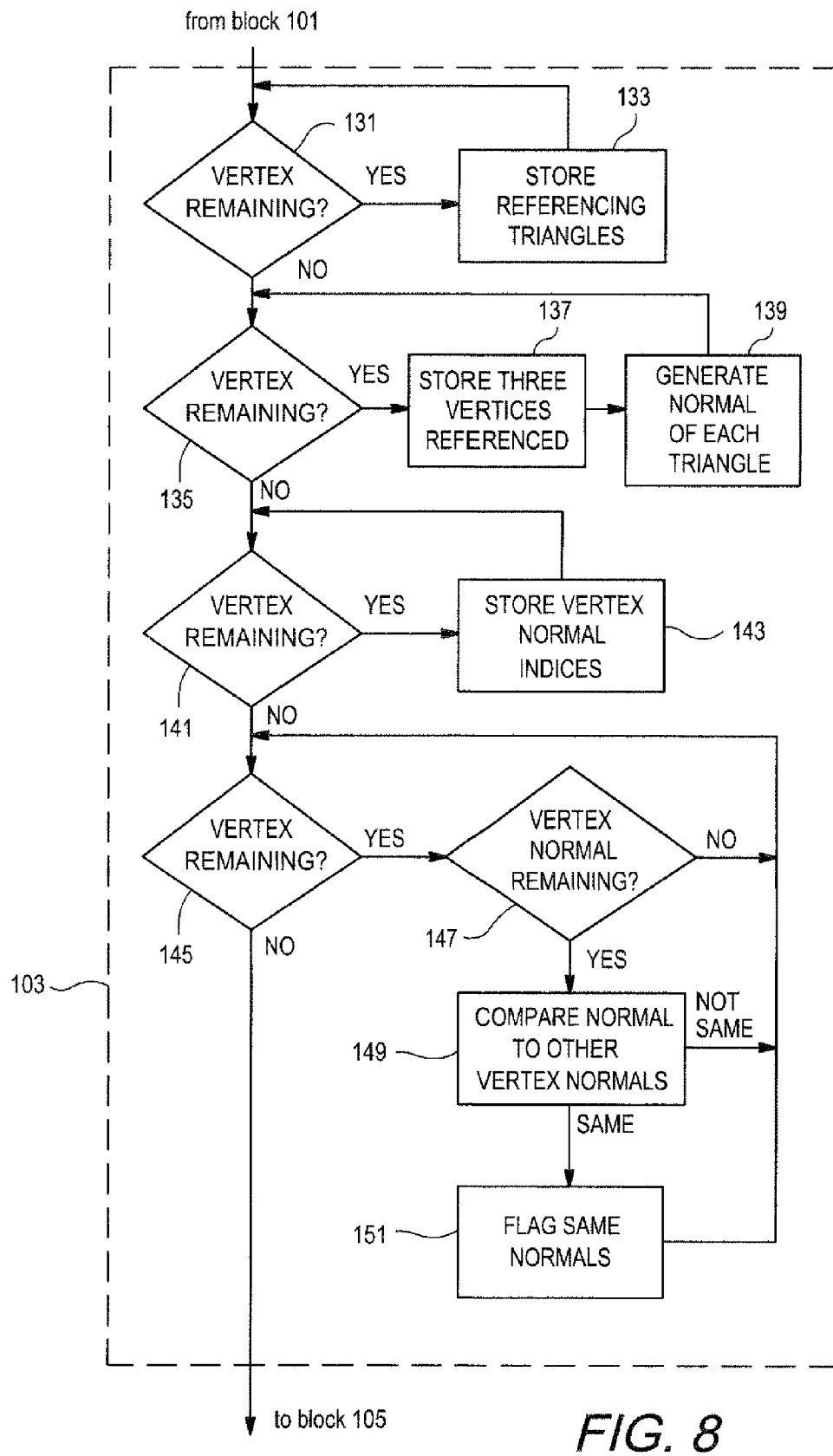
FIG. 8 shows an exemplary flow of a model morph-data generation process.

In addition to creating the models, the developer may generate (as shown in FIG. 8 at block 103) additional data that can be useful for locality based morphing. This data can include, for example:

for each vertex in a model, a list of all triangles that reference the vertex (blocks 131,133);
for each triangle, a list of the three vertices that are referenced by that triangle (blocks 135, 137); and
the normal of each triangle (blocks 139, 141, 143).

The developer may save, in this data structure, the vertex normal indices for each vertex (block 143). The developer may also compare all of the vertex normals and flag the ones that are the same (blocks 145, 147, 149, 151). See FIG. 8 for a more detailed flowchart of an exemplary data structure generation process. This optimization can be used to simplify calculations during run time. According to this implementation, these processes, both the model creation 101 and the data generation 103, may be done at authoring time prior to game initialization but in other implementations could be performed in whole or in part in real time. The results are stored on optical disk 104 or other memory.

Upon game initialization, when the software is read into CPU 204 for execution, the software may control the FIG. 1 system to generate an additional "draw" model (105) for display purposes. Initially, the "draw model" will start out as being a copy of the initial (e.g., undeformed or otherwise unaltered) model. This is the model that is displayed. An array may be generated (block 107) that will specify the degree of morphing between various corresponding vertices of the first and second models created at step 101.

The player may then play the game, and the process detailed in FIG. 6 will wait until the player encounters an object to be affected. The game may, during this time, check (block 109) to see if the object has been interacted with or affected. For example, if the object is to be struck by a game character wielding a hammer, the game may continue to check 109 to see if the game character has in fact struck the object.

Once the game character has interacted with the object, the game may then determine 111 the location and degree of affect the interaction will have on the object. For example, if the object is a large block that must be destroyed, then the game may display, at the appropriate time, a game character encountering a large, unbroken, undented block. If the character then strikes the upper left corner of the block with a hammer, the game, at step 111, may determine that the game character has hit the upper left corner of the block with a certain degree of force. According to this implementation, once the area of effect and the degree of affect have been determined 111, the game may then perform a localized morph of the geometry and texture of the "draw" model created at block 105 to interpolate both the geometry and the surface appearance (shading and texture) of the draw model between the initial (unaffected) model and the completely effected model. Such interpolation is localized in that only a selected subset of the vertices of the draw model are morphed. Selection of which vertices to morph is based in one exemplary illustrative implementation on conventional collision detection techniques indicating which portions of the object have been collided with or otherwise interacted with by other objects in the 3D world.

In an exemplary illustrative non-limiting implementation, when the localized morph is performed, the appearance of the affected game object is changed based on the locality (position) of the interaction and the amount of force or other effect applied at that locality. For example, collision detection can be used to detect a medium powered strike with a hammer to a certain portion of an object. This may cause a corresponding area of that object located around the strike to partially or fully morph between the original model and the final, fully deformed model. Because the morph is a localized shift between an unaffected model and a fully deformed model, the player will get the impression that the object has been realistically affected in a manner consistent with user interaction.

If the developer desires, the degree of morphing performed can be greater at the center point of the strike or other interaction and can trail off further out from the center of the strike. This can create a very realistic "dent" in the object.

Figure 7:
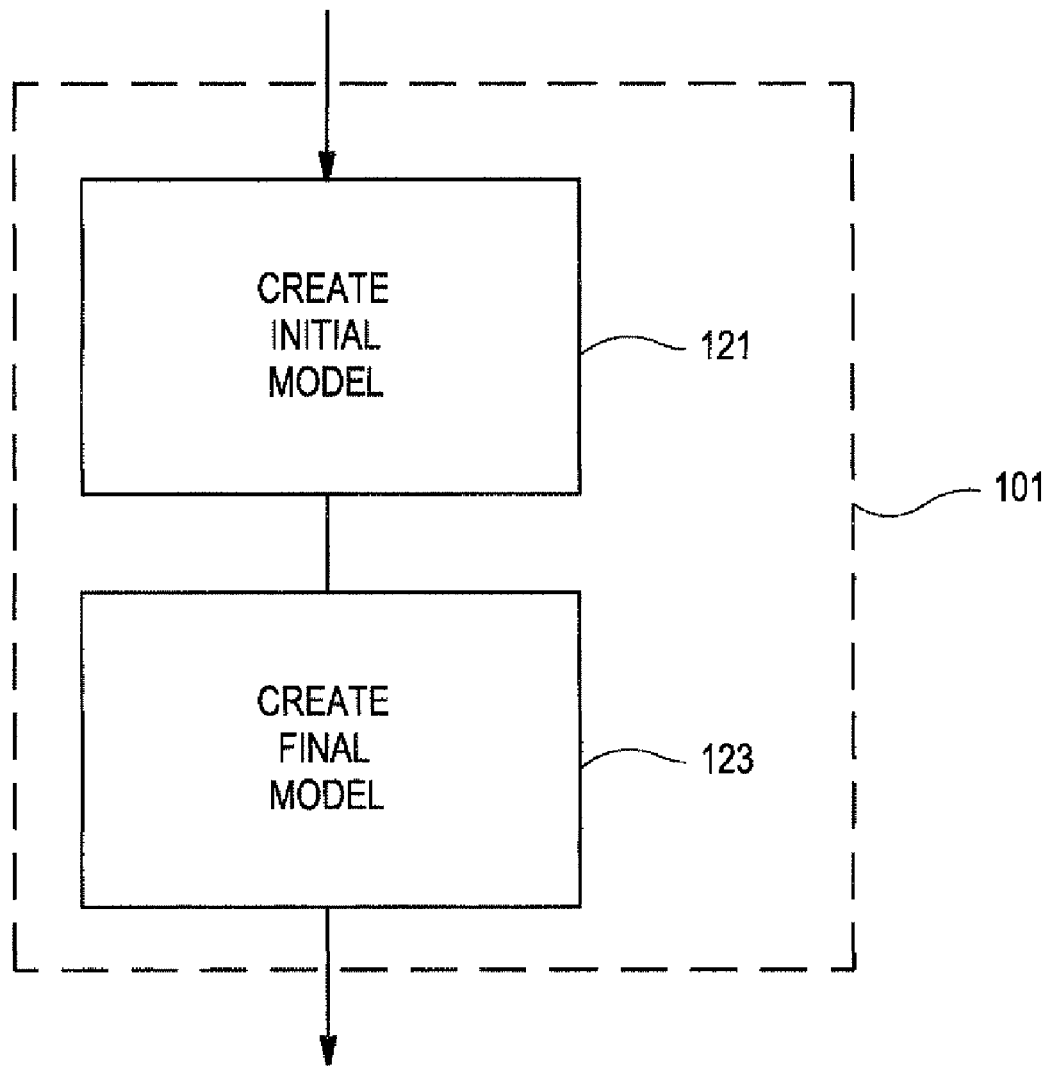
FIG. 7 shows an exemplary flow of a model creation process.
Figure 14:
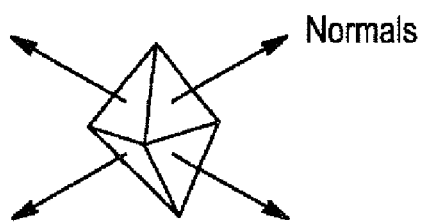
FIG. 14 graphically illustrates exemplary illustrative undeformed and deformed 3D polygon-based wireframe models.
Figure 14:
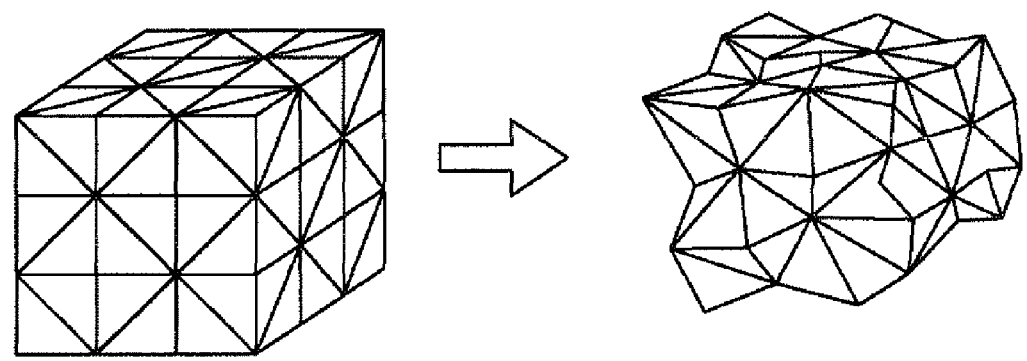
Figure 15:
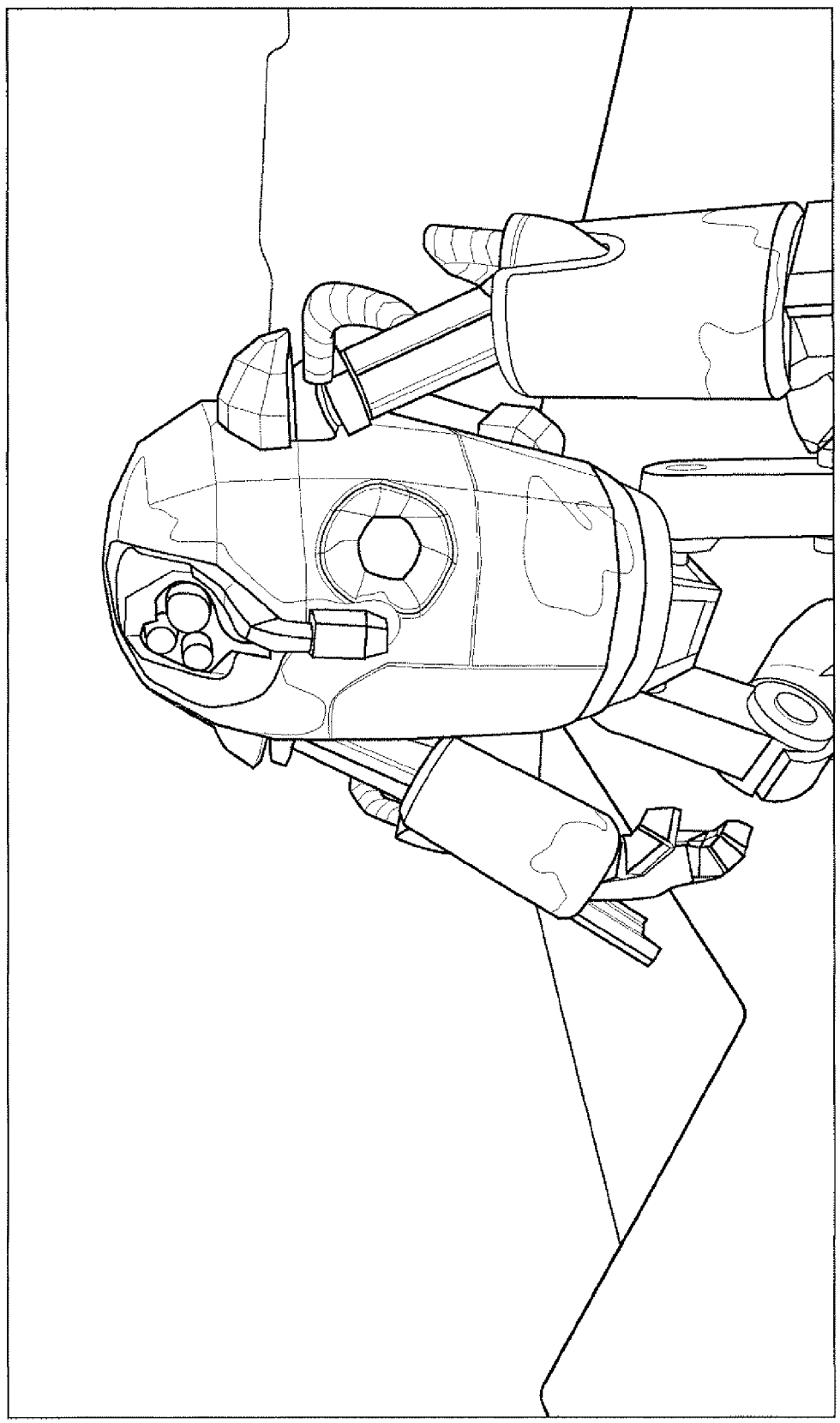
FIGS. 15 and 15A show an exemplary illustrative non-limiting undeformed model of an object.
Figure 15A:
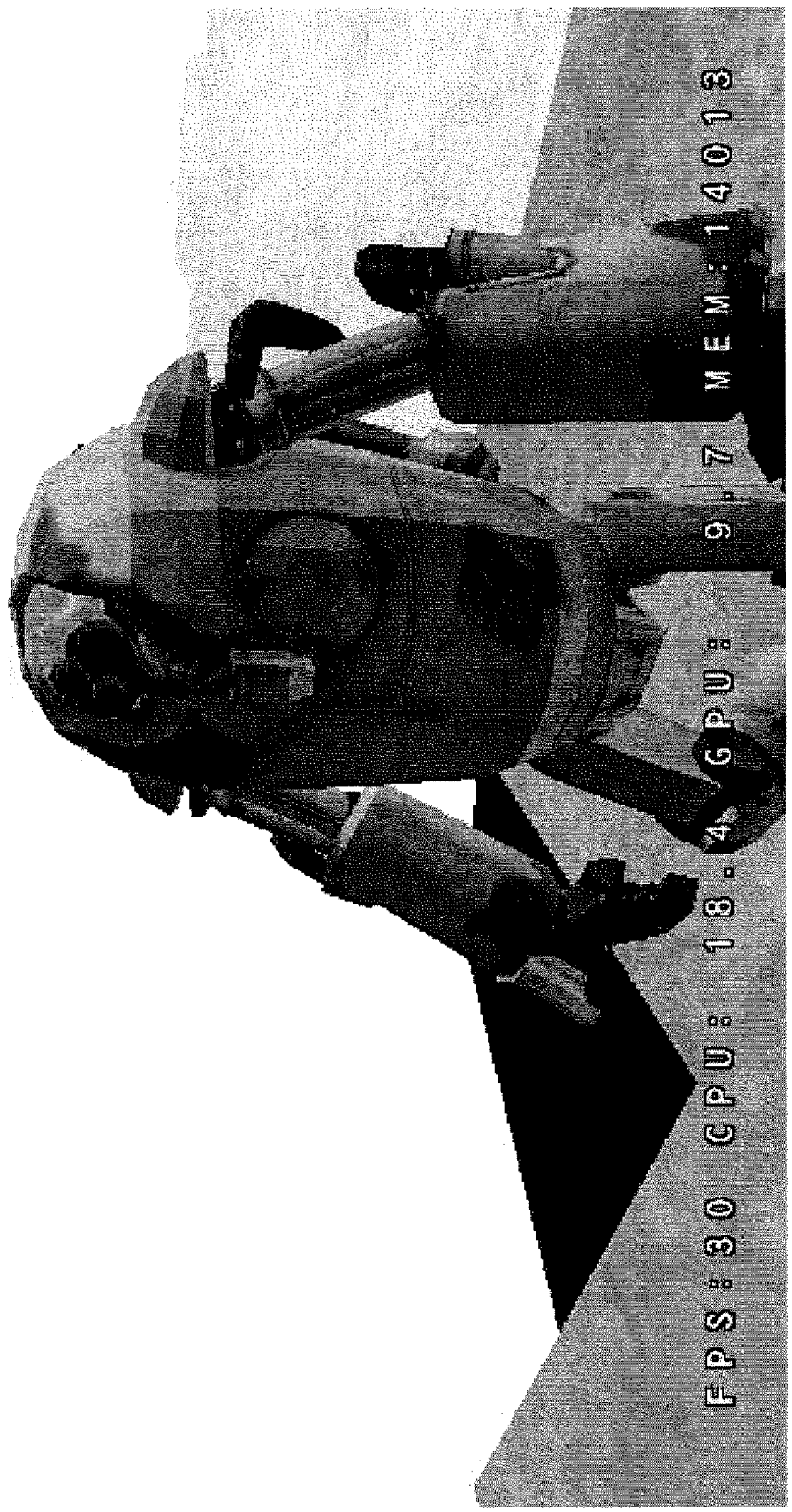
Figure 16:
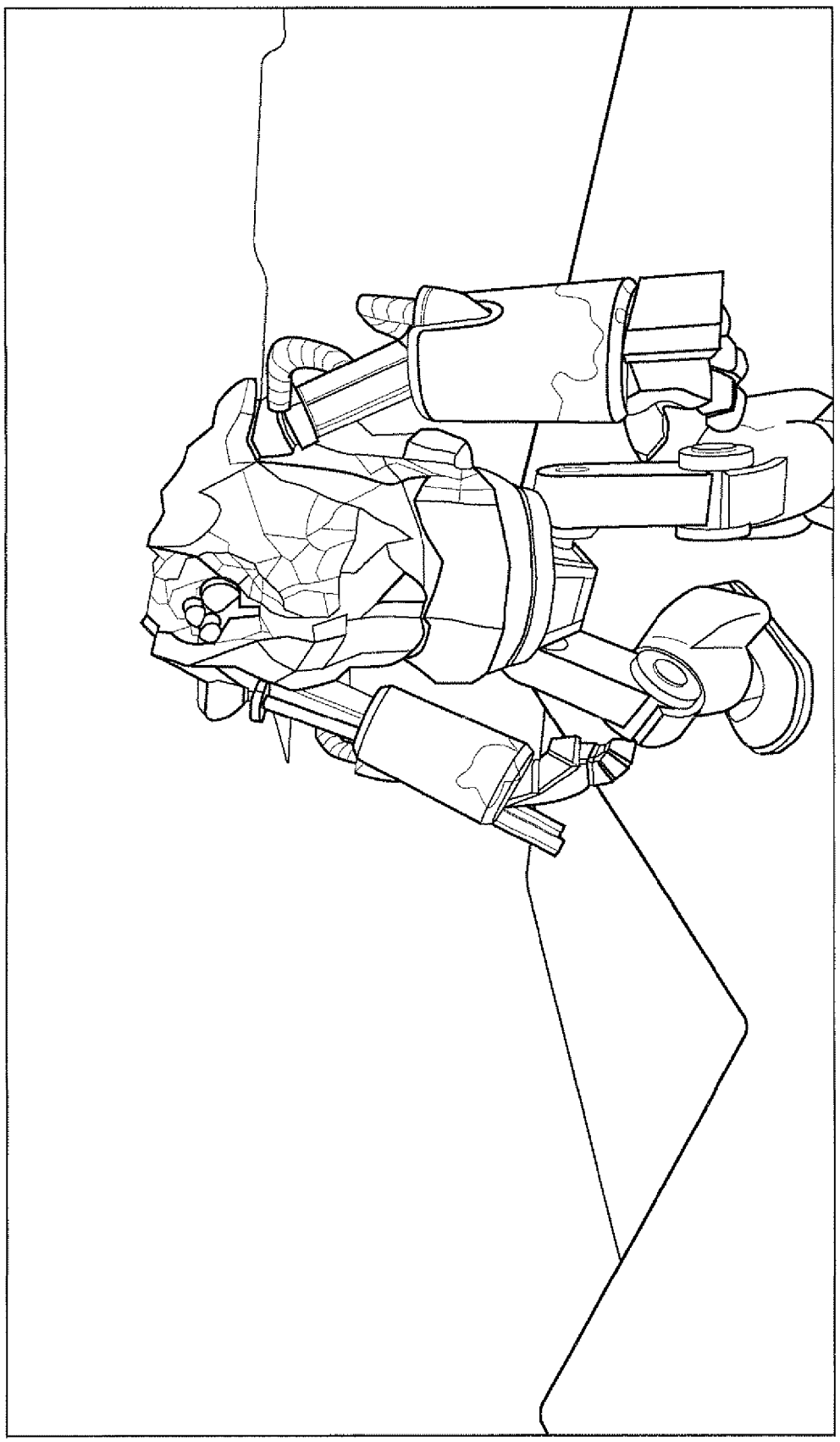
FIGS. 16 and 16A show an exemplary illustrative non-limiting completely deformed model of the object.
Figure 16A:
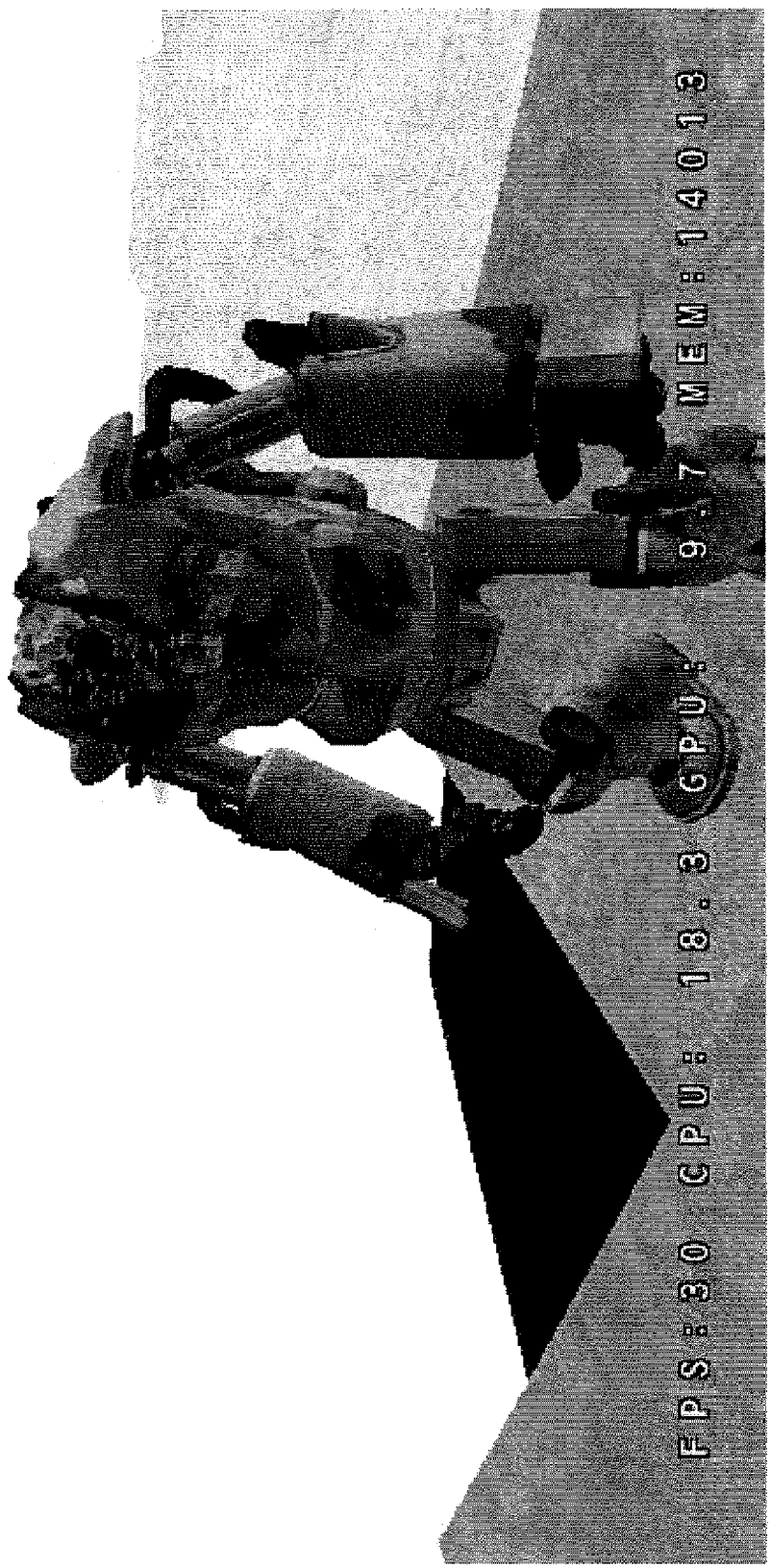
Figure 17A:
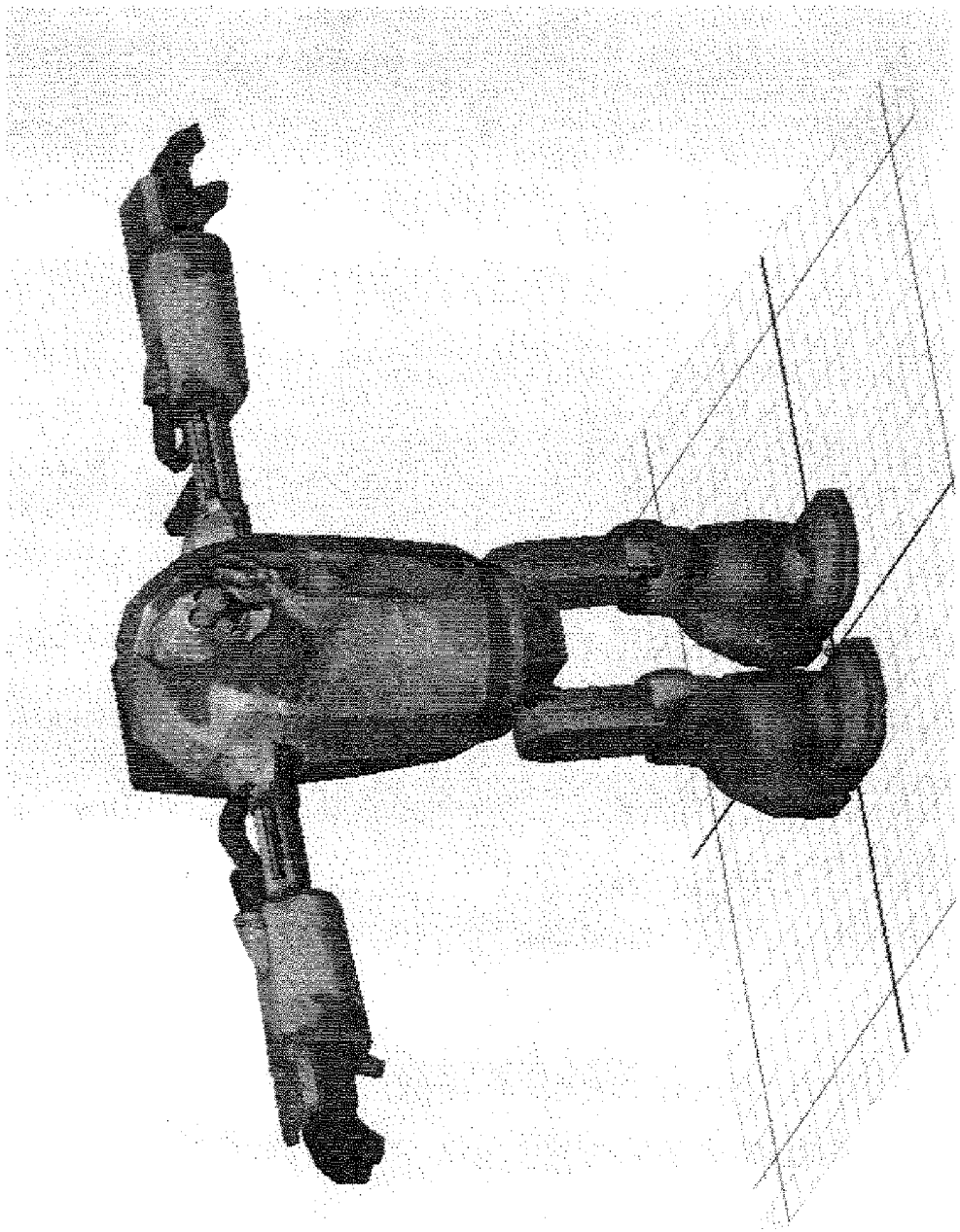
FIGS. 17A and 17B show exemplary illustrative non-limiting additional views of undeformed and completely deformed 3D polygon based models.
Figure 17B:
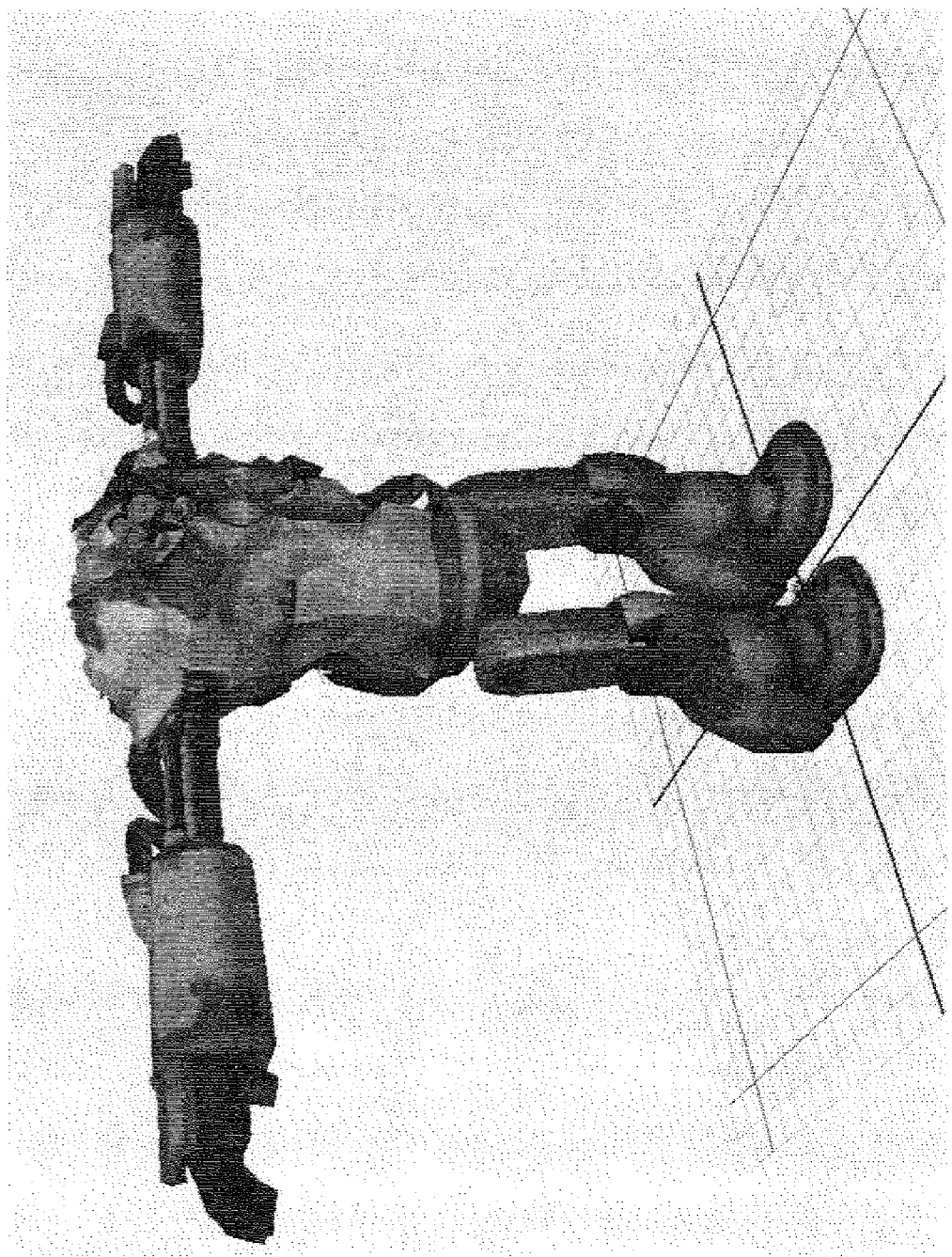

FIG. 7 shows an exemplary flow of a model creation process 101. As previously noted, the game developer may want to both make 121 an initial model that shows an object in its unaffected state and make 123 a final model that shows an object in a completely altered state. If, for example, a game character is going to destroy a 3D car with a hammer, then the developer may want a car in pristine condition as the initial model. The final model can be a car with shattered or missing windows, dented paneling and flat tires. As the game character destroys the car with a hammer or other weapon, the initial model will morph, based on the strength of the strikes, the type of weapon, the location of the strikes, etc., into the dented model in the locality of the weapon strikes. FIG. 14 illustrates an initial model in the form of an undeformed cube and a final model in the form of a fully deformed cube. FIGS. 15 and 15A shown an exemplary illustrative non-limiting example of an initial unaffected model, and FIGS. 16 and 16A show an exemplary illustrative non-limiting example of a fully affected (deformed) model. FIGS. 16 and 16A show an additional example, respectively.

In one exemplary illustrative non-limiting implementation, localized morphing between two models is performed by correlating vertices of the two models and interpolating between the corresponding vertices in a spatially selective way. As the alteration process progresses over increasing portions of the surface area of the object, the appearance of the displayed object shifts in a spatially progressively way from the original model to the final model.

Figure 9:
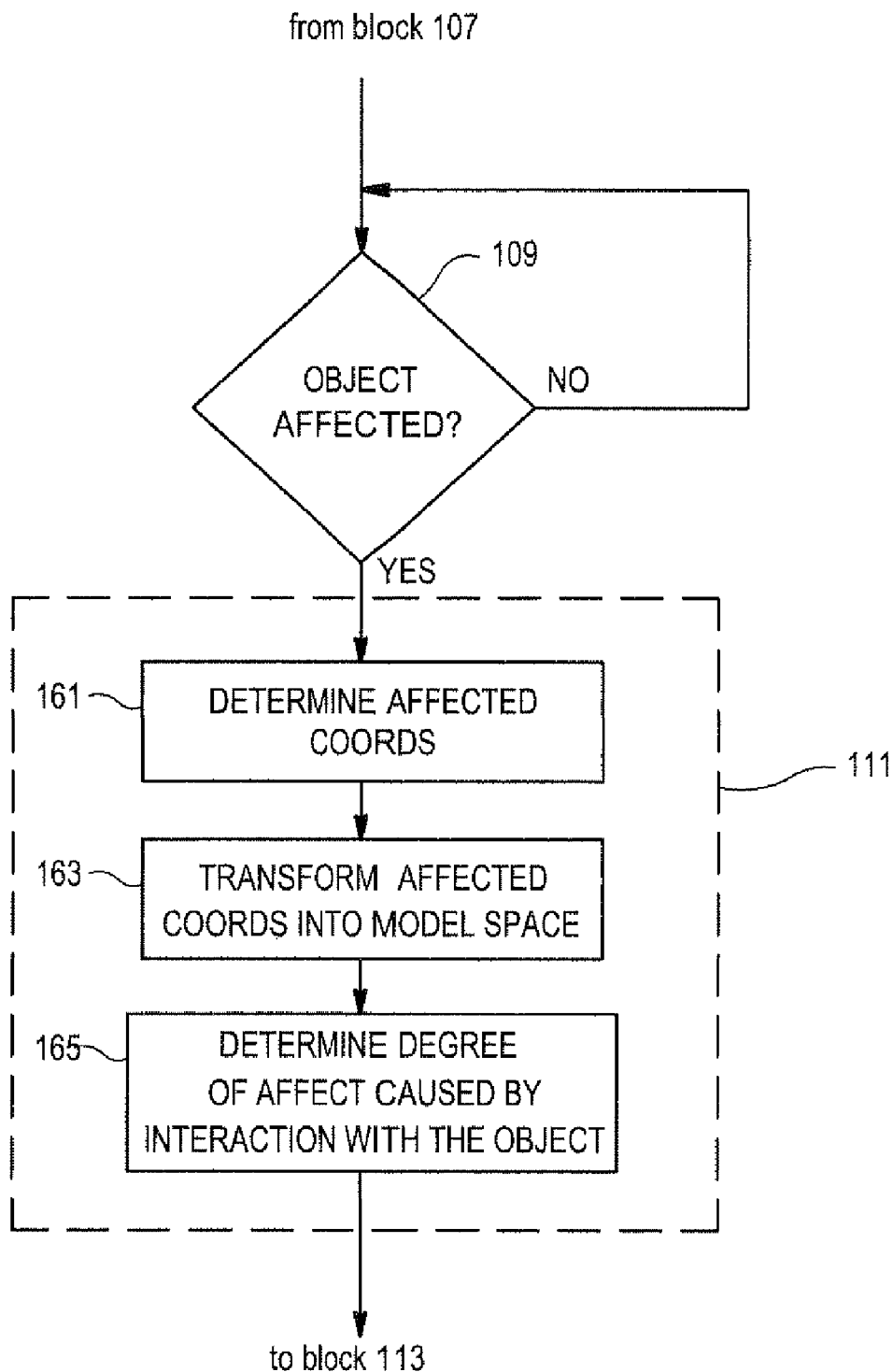
FIG. 9 shows an exemplary flow of a morph parameter detection process.
Figure 10:
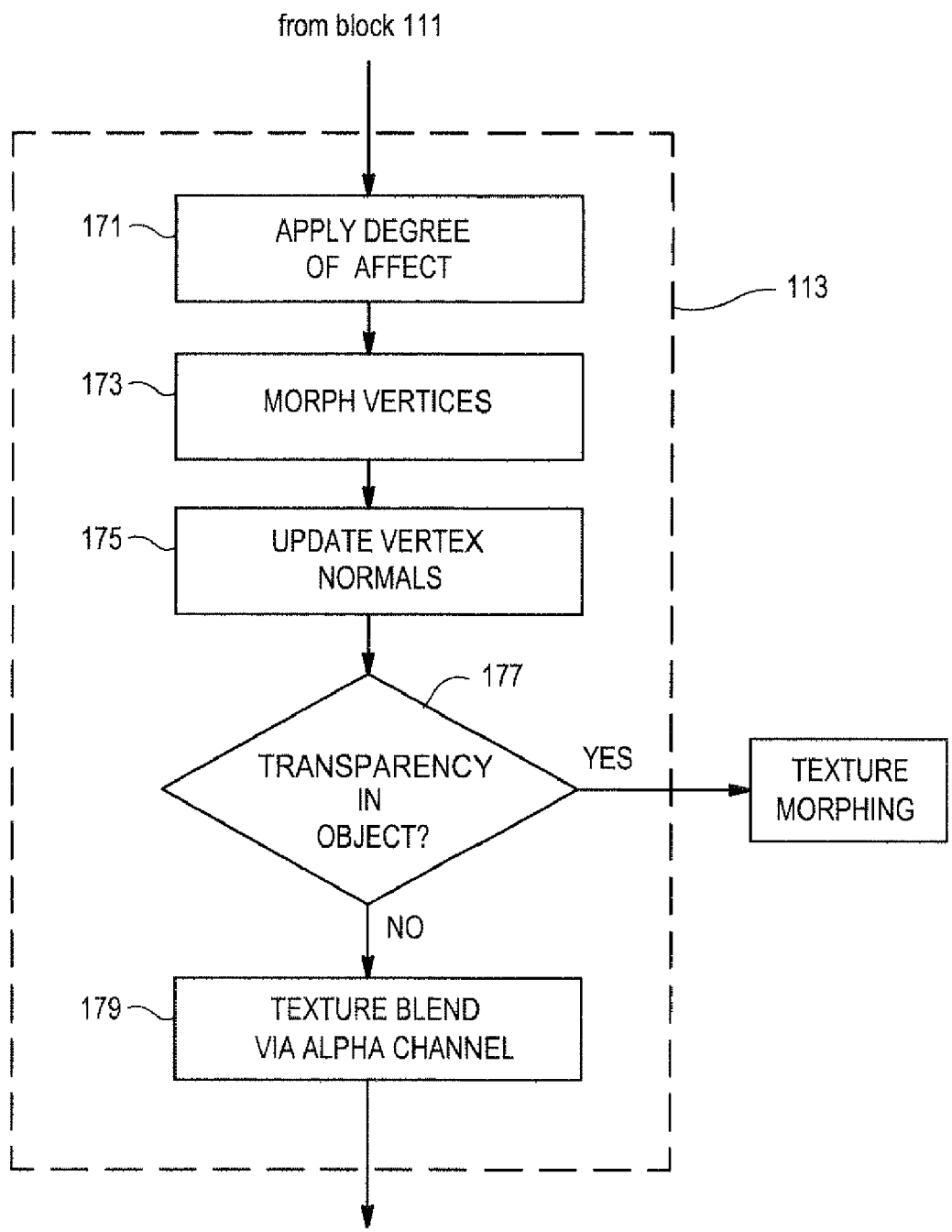
FIG. 10 shows an exemplary flow a localized morph application process.

According to a further illustrative exemplary non-limiting implementation, when a player affects an object to which a localized morph is to be applied, the program determines which coordinates have been affected and to what degree they have been affected. An exemplary flow for such a determination process 111, is shown in FIG. 9. The program may first determine 109 whether or not the object has been affected using for example conventional collision detection or other algorithms. In an example where the game character is striking an object with a hammer, this would be a determination as to whether or not the game character has struck the object with a hammer. Once the program has determined 109 that the game character has affected the object, the program may determine 161 where the object was affected. In the example of a character wielding a hammer, the program would determine where the hammer strike fell. In addition to the affected coordinates, the program may transform 163 the affected coordinates into model space so they can be correlated with the models created as described above. Also, the program may determine 165 the degree of the affect caused by the game character's interaction with the object. For example, based on how hard a game character strikes an object with a hammer, the program may determine 165 how complete of a morph (percentage of interpolation) between the initial model and the final model to apply at that locale After calculating the locality and degree of change to an object based on player interaction or other effects, the game system will then in one exemplary illustrative non-limiting implementation apply the localized morph to the object. FIG. 10 shows an exemplary flow of a localized morph application process 113. According to an illustrative exemplary non-limiting implementation, the process may use the degree of affect determined at step 165 and apply 171 that value to the morph blend or interpolate values of affected vertices. According to this implementation, the affected vertices were previously determined at step 161. Applying the degree of affect to the morph blend values allows the game to determine how complete of a morph should be performed for that part of the object. Once the degree of affect has been applied, the process may then morph 173 the affected vertices to the extent determined by the morph blend values. This morph will leave the affected portion of the object in a displayed state somewhere on a spectrum from the original model and the final model. Areas that have not been affected retain characteristics of the initial model. Areas that have been affected are progressively morphed toward the final model. The amount of interpolation between the initial and final models is determined in one exemplary illustrative implementation by the amount of force applied to the area. Some areas of the object may be completely morphed, other areas of the object may not be morphed at all (yet), and still other areas may be partially morphed.

For each such progressive morphing transformation, the software may also update 175 the vertex normals, once the morph has been processed, to ensure that the lighting on the newly displayed model is still correct. If the object does not have any transparency 177, an alpha channel may be used to blend textures 179. Otherwise, texture blending may occur using other conventional means to provide well-known texture morphing as well as geometry morphing.

Figure 11:
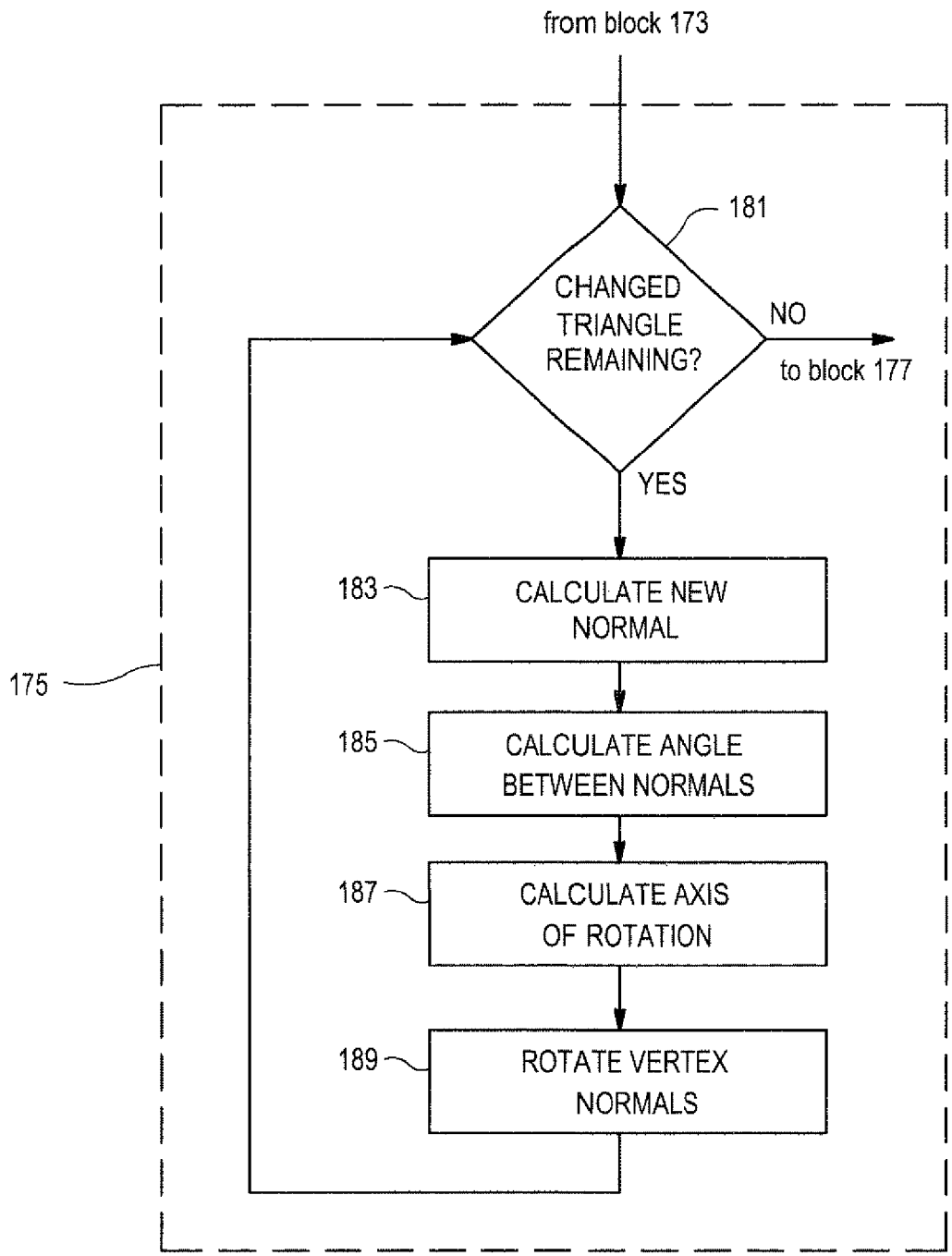
FIG. 11 shows an exemplary flow of a lighting correction process.

According to this implementation, to update 175 the vertex normals to ensure appropriate lighting, the software may perform the steps in the exemplary normal update process 175 shown in FIG. 11. The program determines 181 whether or not there are any triangles remaining that have been changed by the morph. If there is a remaining triangle to which the correction steps have not been applied, the program calculates 183 the new normal for that triangle. Then, the program may calculate the angle 185 between the original triangle normal and the newly calculated triangle normal. The program may also calculate the axis of rotation 187 to go from the old triangle normal to the new triangle normal. Using the axis of rotation and the angle between the old and new triangle normals, the program may then rotate 189 the vertex normals for that triangle. This process can then be continued for all of the triangles that were affected by the morph. Other lighting/shading adjustment and blending algorithms can be used as desired.

The exemplary illustrative non-limiting implementations allow games and other graphics display generation processes to selectively alter specific portions of models in reaction to player interaction with those models. Since the locality based morphing done by a game according to the exemplary illustrative non-limiting implementations can be dynamically determined and applied, the player can dynamically determine on an interactive basis what change is done to a model and where, and the player can, through different actions, have a different game experience each time the player interacts with a model. Meanwhile, the author has a great degree of freedom in determining how a player's interactions will affect a model. Interaction with a model while using different developer provided tools or implements may have different results. For example, a player striking a game object with a piece of wood may not do as much damage to the object as a player striking the same object with a metal hammer.

Figure 12A:
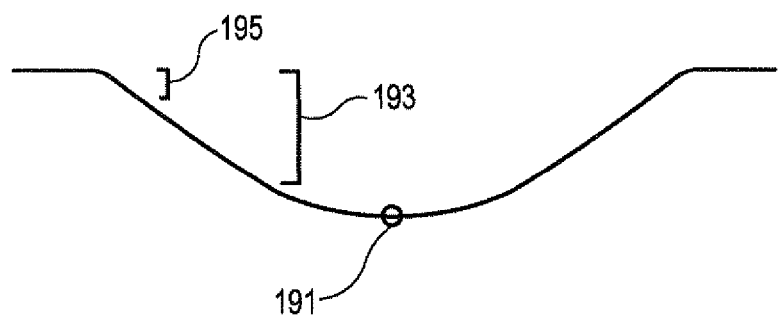
FIGS. 12A, 12B and 12C show different exemplary illustrative non-limiting localized morphing deformation profiles.
Figure 12B:
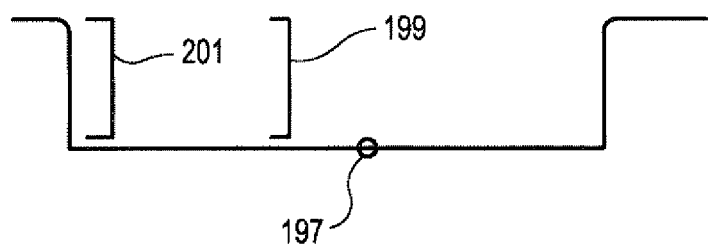
Figure 12C:
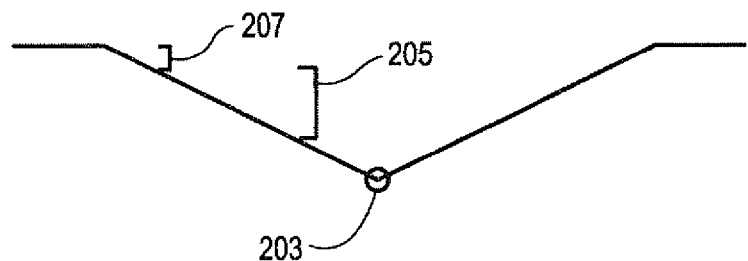

One of the things that a developer may control on an object is the way that the morph is applied to the object at distances further out from the center point of the strike. FIGS. 12A, 12B, and 12C show some exemplary damage application curves suggesting several possible ways that a morph could be applied.

For example, FIG. 12A shows damage being applied in a curve-like fashion out from the center of a point of impact 191. The developer may wish to use a damage application like this if the player hits an object with a curved implement. Once example of an implement that might make such a dent would be a ball peen hammer. A baseball bat might also make such a dent in an object. The degree of morphing between the original varies over the length of the dent. An area 193 closer to the point of impact 191 has a greater degree of morphing applied to it than an area 195 further out from the point of impact 191. FIG. 12B, on the other hand, shows damage being applied equally at all affected portions of an impact point 197. If a player struck a pliable material heavily with a solid, flat object, such as a mallet, then a dent like the one shown in FIG. 9B might be made. According to the exemplary transform of FIG. 12B, the degree of morphing in an area 199 close to the point of impact 197 is the same as the degree of morphing at the affected area 201 farthest from the point of impact 197. FIG. 12C, as a third example, shows a wedge-like dent being made in an object, such as might occur if a player struck an object with an axe or a wedge. In this exemplary transform, like in FIG. 12A, the degree of morphing in an area 205 closer to the point of impact 203 is greater than the degree of morphing further 207 from the point of impact. Thus, in these examples, the localized morphing interpolation factors are determined by the shape of a virtual weapon used to interact with the object as well as by the location the virtual weapon strikes the object. Of course, it is not necessary to apply the damage in relation to the type of tool or weapon used. For example, the developer could use any other function than the ones shown to determine damage, the figures shown here are just three examples which suggest possible regular damage application transforms.

Figure 13:
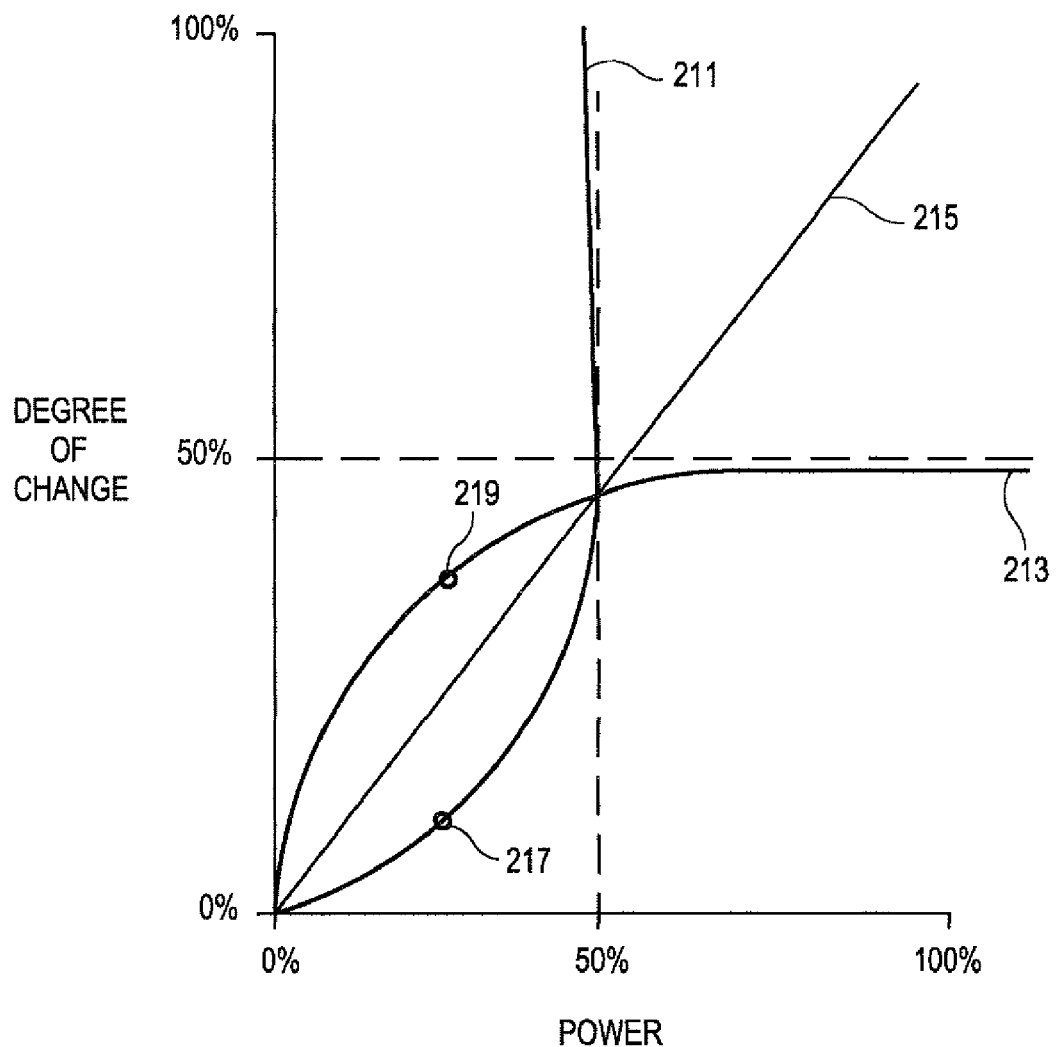
FIG. 13 graphically illustrates exemplary illustrative non-limiting correlations between amount of applied force and amount of deformation.

In addition to determining how the damage is applied over the affected area, the developer may also need to determine how great the degree of change is at the initial point of impact. Using this determination, the developer can then apply a gradient of change out from that point based on transforms such as the exemplary transforms shown in FIGS. 12A, 12B and 12C. FIG. 13 shows some exemplary determinations of degree of change at the point of impact based on power of a character's swing and a second factor. For example, the line that rapidly slopes upward 211 could be an example of the change applied at an impact point where a character is wielding a heavy hammer. Since there is a maximum amount of change that can be applied, that is, when the morph has fully switch over to the final image, a character with a heavy hammer may only need to strike an object with a medium degree of power to reach that point. A light tap with a hammer, such as shown at point 217, may not do a lot of damage, but by the time the strike reaches 50% of the maximum power 100% of the change is being applied at the point of impact. Alternatively, say the game character is wielding a piece of wood with spikes. A light strike from a spiky piece such as shown at point 219 might do more damage than a light hammer strike, due to the spikes, but no matter how hard the game character swings the wood, it cause no more than 50% of a degree of change with a single strike as is shown by the line 213. This could be because the wood breaks, because it is just not strong enough, etc. Of course, the designer may just want damage to uniformly equate to power, and a straight line 215 would provide this sort of calculation, where the more power the game character uses the more damage is done. Any determination of power to change may be used, and factors other than power may also be used to determine damage. For example, power could be replaced on the graph by strength of the tool being used, and then the line chosen could be determined by the malleability of the object being struck or affected. Line 211 would be the damage done by any tool used on a very malleable material, tin or lead, for example, such that any tool of 50% or greater of the maximum tool strength would cause maximum damage. Line 213, on the other hand, would be a very resilient material, thick steel or diamond, for example, such that even the strongest tools would affect the material only a marginal amount. The game developer can apply any desired factors to achieve a determination of how the degree of change is calculated at the initial impact point.

An additional detailed non-limiting example of how a method of the exemplary illustrative non-limiting implementations might be performed is as follows:

1. Two models are created in a 3D Authoring Tool Program
   a. The original un-dented model
   b. The final completely dented model
2. Generate some data used to perform locality based morphing
   a. For each vertex store all triangles that reference this vertex
   b. For each triangle store the 3 vertices that will be referenced
   c. For each triangle generate the normal
   d. For each vertex save the vertex normal indices
   e. For each vertex go through all the vertex normals and flag ones that are the same.
3. In-game at init create a new model that will be the drawn model and also create an internal array to say how much to morph between each vertex
4. During the game, if the object is hit, calculate where the object was hit and then transform this position into model space. Also, calculate how "hard" this object was hit. (this step does not have to be based on an object being "hit", it could be based on other factors).
5. Next, take this position and damage amount and perform the locality based morph.
   a. Apply the damage amount to the morphing blend values for the specific vertices that will be affected.
   b. Using the morphing blend values morph the affected vertices between the original un-dented model and the dented model.
   c. Update the vertex normals so that the lighting will still be correct
      i. For each changed triangle calculate the new triangle normal.
      ii. Calculate the angle between the original triangle normal and the new triangle normal
      iii. Calculate the axis of rotation to go from the original triangle normal to the new triangle normal
      iv. Using the axis of rotation and the angle between the two triangle normals rotate the vertex normals
   d. Also, if the object doesn't contain any transparency, use the alpha component of the color to control a texture operation that will combine two textures (the original model's texture and the dented model's texture).

While the technology herein has been described in connection with exemplary illustrative non-limiting embodiments, the invention is not to be limited by the disclosure. The invention is intended to be defined by the claims and to cover all corresponding and equivalent arrangements whether or not specifically disclosed herein.

We claim:

1. A method of implementing a locality-based morphing between two polygon-based models for rendering an affected object on a computer graphics display, comprising:
   providing a first polygon-based 3D model of an object and a second polygon-based 3D model of the object, the second 3D model being similar to the first 3D model but comprising plural predetermined spatially altered portions relative to said first model;
   providing one or more interpolation degree-of-change functions that define a percentage of morphing that is effected between said first and second models as a function of a predetermined interaction parameter;
   providing one or more locality-based morphing application curve profiles that define a gradient/curve which determines how morphing is to be implemented over a localized area of an object as a function of distance from an interaction point on the surface of an object;
   determining affected object information indicative of an interaction location point on said object;
   determining affected object information indicative of an interaction parameter, the interaction being based upon a selected one of said interpolation degree-of-change functions;
   performing a modified interpolation between one or more vertex associated attributes of said first polygon-based 3D model and said second polygon-based 3D model, wherein said interpolation is modified by using a selected one of said interpolation degree-of-change functions and applying a selected one of said locality-based morphing application curve profiles such that the interpolation is performed only between a subset of polygon vertices centered about the determined interaction location point on said object; and generating a new 3D model corresponding to a spatially selective metamorphosization of the first 3D model based on said modified interpolation between said first and second 3D models to provide a localized transformation of less than all of said object.

2. The method of claim 1 further including updating vertex normals to provide realistic lighting effects.

3. The method of claim 1 further including using an alpha component to control the texture operation that morphs a texture associated with said first 3D model with a texture associated with said second 3D model.

4. The method of claim 1 wherein said predetermined interaction parameter relates to a virtual interaction force or pressure.

5. The method of claim 1 wherein said predetermined interaction parameter relates to a user interaction determined by a signal obtained from a controller device.

6. The method of claim 1 wherein different interpolation degree-of-change functions are based upon different interaction parameters.

7. The method of claim 1 wherein at least one interpolation degree-of-change function is a function indicative of a malleability characteristic of the affected object and a power-of-impact based interaction parameter.

8. The method of claim 1 wherein different locality-based morphing application curve profiles are based upon a shape of a virtual object used to interact with the affected object.

9. The method of claim 1 wherein different locality-based morphing application curve profiles are based upon a predetermined characteristics of an object within one or more predetermined areas or regions on the affected object.

10. A method of implementing a locality-based morphing between two polygon-based models for rendering a computer graphics object affected by an interaction occurring in a video game, comprising:

providing a first polygon-based model of said object;

providing a second polygon-based model of said object, said second polygon-based model exhibiting extensive deformation relative to said first model;

providing a plurality of degree-of-change functions each of which define a percentage of morphing to be implemented between said first and second models as a function of a particular game parameter, the morphing performed as an interpolation operation between each polygon vertex of said first model and each corresponding polygon vertex of said second model;

providing a plurality of locality-based morphing application transforms each of which define a localized change to be applied to a model as a function of distance from an interaction point located on the surface of an object;

determining object information indicative of an interaction location on said object;

determining object information indicative of an interaction parameter;

performing an interpolation between one or more vertices of said first model and said second model, wherein said interpolation is modified by a selected one of said degree-of-change functions in accordance with said object information indicative of an interaction parameter and by a selected one of said locality-based morphing application transforms in accordance with said object information indicative of an interaction location on said object, such that the interpolation is performed between only a subset of the polygon vertices of said first model and corresponding polygon vertices of said second model to provide an intermediate model that exhibits a locality based metamorphosization centered about the interaction location on said object; and rendering said intermediate model on a display.

11. The method of claim 10 wherein said first model is completely non-deformed and said second model is completely deformed.

12. The method of claim 10 wherein said first model has at least one associated texture and second model has at least one associated texture, and said method further includes selectively blending said first model texture with said second model texture at said position.

13. The method of claim 10 further including updating vertex normals to provide photorealistic lighting effects.

14. The method of claim 10 wherein said interaction parameter relates to a virtual interaction force or pressure.

15. The method of claim 10 wherein said interaction parameter relates to a user interaction determined by a signal obtained from a controller device.

16. A computer graphics system for implementing locality-based morphing between two polygon-based models for simulating progressive damage to an animated or simulated object, comprising:

a storage device that stores a first polygon-based model of said object and a second polygon-based model of said object, said second polygon-based model exhibiting extensive deformation relative to said first model;

a memory that maintains a data structure comprising one or more interpolation degree-of-change functions and one or more locality-based damage application curve transforms for modifying an interpolation operation to be performed between polygon vertices of said first model and each corresponding polygon vertex of said second model, wherein an interpolation degree-of-change function defines a percentage of morphing that occurs between said first and second models as a function of a predetermined factor or object characteristic, and a locality-based damage application curve transform determines how morphing is to be implemented over a localized area of an object as a function of distance from a damage incursion point on a surface of an object;

a user input device that provides user input information indicating a damage incursion point position on said object to be deformed;

a processor that performs an interpolation operation between only a subset of the polygon vertices of said first model and corresponding polygon vertices of said second model in accordance with a predetermined one of said interpolation degree-of-change functions and a predetermined one of said locality-based damage application curve transforms to provide an intermediate model that exhibits metamorphosization in only selected locations determined at least in part by said predetermined factor or object characteristic and said user input information; and a 3D rendering engine that renders said intermediate model on a display.

17. A storage device that stores at least the following data and computer executable program instructions for use in simulating progressive deformation to a computer graphics rendered object:

a first polygon-based model of said object;

a second polygon-based model of said object, said second polygon-based model exhibiting extensive deformation relative to said first model;

first program instructions executable by a computer to enable the computer to generate or maintain a data structure comprising one or more interpolation degree-of-change functions and one or more locality-based deformation application transforms for modifying an interpolation operation to be performed between polygon vertices of said first model and each corresponding polygon vertex of said second model, wherein an interpolation degree-of-change function defines a percentage of morphing that occurs between said first and second models as a function of a predetermined factor or object characteristic, and a locality-based deformation application transform determines how morphing is to be implemented over a localized area of an object as a function of distance from a damage incursion point on a surface of an object;

second program instructions executable by a computer to enable the computer to determine a deformation incursion point position on said object to be deformed;

third program instructions executable by a computer to enable the computer to perform an interpolation operation between only a subset of the polygon vertices of said first model and corresponding polygon vertices of said second model in accordance with a predetermined one of said interpolation degree-of-change functions and a predetermined one of said locality-based deformation application transforms to provide an intermediate model that exhibits metamorphosization in only selected locations determined at least in part by said predetermined factor or object characteristic and said user input information; and fourth program instructions executable by a computer to enable the computer to control, at least in part, a rendering of said intermediate model on a display.

18. A method of implementing a locality-based morphing between two polygon-based models for rendering an affected object on a computer graphics display, comprising:

providing a first polygon-based model of said object;

providing a second polygon-based model of the object, said second polygon-based model comprising plural predetermined spatially altered portions relative to said first model;

providing a plurality of different locality-based morphing application curve profiles that define a gradient/curve which determines how morphing is to be implemented over a localized area of an object as a function of distance from an interaction location on the surface of an object;

determining object information indicative of an interaction location on said object;

performing an interpolation between said first model and said second model in accordance with a selected one of said locality-based morphing application transforms and said object information indicative of an interaction location on said object.

* * * * *